US008736398B2

(12) United States Patent  
Caron et al.

(10) Patent No.: US 8,736,398 B2
(45) Date of Patent: May 27, 2014

(54) DIPLEXED TX FILTER AND RF SWITCH WITH INTERMODULATION SUPPRESSION

(75) Inventors: Joshua J. Caron, Madison, NC (US); Nadim Khlat, Cugnaux (FR)

(73) Assignee: RF Micro Devices, Inc., Greensboro, NC (US)

( * ) Notice: Subject to any disclaimer, the term of this patent is extended or adjusted under 35 U.S.C. 154(b) by 229 days.

(21) Appl. No.: 13/197,216

(22) Filed: Aug. 3, 2011

(65) Prior Publication Data

US 2012/0146742 A1 Jun. 14, 2012

Related U.S. Application Data

(60) Provisional application No. 61/421,416, filed on Dec. 9, 2010.

(51) Int. Cl.
*H01P 5/12* (2006.01)

(52) U.S. Cl.
USPC ............ 333/126; 333/129; 333/132; 333/134

(58) Field of Classification Search
USPC .................. 333/126–129, 132, 134
See application file for complete search history.

(56) References Cited

U.S. PATENT DOCUMENTS

| | | | |
|---|---|---|---|
| 6,392,779 B1 | 5/2002 | Iannelli et al. | |
| 6,496,064 B2 | 12/2002 | Rzyski | |
| 6,757,338 B1 | 6/2004 | Kim et al. | |
| 7,693,674 B2 | 4/2010 | Rzyski et al. | |
| 2002/0070803 A1 | 6/2002 | Rzyski | |
| 2007/0032976 A1 | 2/2007 | Rzyski et al. | |
| 2008/0197936 A1 | 8/2008 | Berg | |
| 2009/0015508 A1 | 1/2009 | Prikhodko et al. | |
| 2010/0049463 A1 | 2/2010 | Rzyski et al. | |
| 2013/0169378 A1* | 7/2013 | Kim et al. .................... 333/126 |

OTHER PUBLICATIONS

Non-final Office Action for U.S. Appl. No. 13/170,593 mailed Dec. 13, 2012, 6 pages.
Final Office Action for U.S. Appl. No. 13/170,593, mailed Apr. 5, 2013, 8 pages.
Final Office Action for U.S. Appl. No. 13/170,593, mailed May 20, 2013, 6 pages.
Non-Final Office Action for U.S. Appl. No. 13/170,593, mailed Jul. 19, 2013, 6 pages.
Non-Final Office Action for U.S. Appl. No. 13/272,537, mailed Sep. 6, 2013, 6 pages.
Notice of Allowance for U.S. Appl. No. 131272,537, mailed Dec. 4, 2013, 7 pages.
Final Office Action for U.S. Appl. No. 131170,593, mailed Dec. 16, 2013, 9 pages.

* cited by examiner

*Primary Examiner* — Robert Pascal
*Assistant Examiner* — Kimberly Glenn
(74) *Attorney, Agent, or Firm* — Withrow & Terranova, P.L.L.C.

(57) ABSTRACT

Disclosed is a diplexed transmit (TX) filter and RF switch for suppressing third order intermodulation (IM3) products. Included are first and second duplexers each having a receive (RX) port, a TX port, and an RX/TX port. Also included are first and second power splitter/combiners each having first, second, and third terminals. Further included are first, second, and third phase shift networks. The first power splitter/combiner's first terminal is coupled to the first duplexer's TX port and a first switch segment is coupled between the first duplexer's RX/TX port and the first terminal of the second coupler. The first phase shift network is coupled to the second duplexer's TX port and a second switch segment in series with the second phase shift network is coupled between the second duplexer's RX/TX port and second coupler's second terminal. The third phase shift network is coupled to the second duplexer's RX terminal.

22 Claims, 29 Drawing Sheets

US 8,736,398 B2

1

DIPLEXED TX FILTER AND RF SWITCH WITH INTERMODULATION SUPPRESSION

RELATED APPLICATIONS

This application claims the benefit of provisional patent application Ser. No. 61/421,416, filed Dec. 9, 2010, the disclosure of which is hereby incorporated herein by reference in its entirety. This application is related to U.S. patent application Ser. No. 13/170,593 entitled RADIO FREQUENCY SWITCH FOR SUPPRESSING INTERMODULATION filed Jun. 28, 2011, the disclosure of which is incorporated herein by reference in its entirety. This application is also related to a concurrently filed utility application entitled RF SYSTEM HAVING INTERMODULATION SUPPRESSION BRANCHES, the disclosure of which is incorporated herein by reference in its entirety.

FIELD OF THE DISCLOSURE

The present disclosure relates to suppressing intermodulation (IM) products generated by electronic devices used in wireless communication products such as mobile terminals.

BACKGROUND

It is well-known that mobile terminal operation can be degraded by the presence of a strong interfering signal. For example, a nearby mobile terminal or base station operating at a different frequency can produce strong interfering signals. Furthermore, communications industries, and in particular, the cellular communication industry desires an ability to transmit and receive signals in two separate bands at the same time within a single mobile terminal. However, implementing such a request practically guarantees strong signal interference within the single mobile terminal.

In the short term, a desire to talk and surf the web simultaneously on a single band is not possible due to shortcomings in the Evolution-Data Optimized (EVDO) standard. As a result of these shortcomings, a requirement has emerged for mobile terminals that can operate simultaneously on code division multiple access (CDMA) Band 5 for voice and long term evolution (LTE) Band 13 for data. This requirement is known as simultaneous voice/LTE (SV-LTE).

Unfortunately, due to the aforementioned interference problems, SV-LTE cannot be facilitated by simply operating two cellular front ends at the same time. For example, a major reason that a strong interferer signal degrades mobile terminal operation is a generation of third-order intermodulation (IM3) products in nonlinear electronic components such as RF switches that the signals encounter. This nonlinear phenomenon is a result of compression and/or clipping of the high-power signals as their levels exceed the linear dynamic range of the nonlinear electronic components. If a signal A is incident upon an electronic component that compresses the signal A, a resulting signal $A_{compressed}$ can be modeled with an odd-order power series as follows in expression (1):

$$A \to A_{compressed} = \alpha_0 A - \alpha_1 A^3 + \alpha_2 A^5 - \alpha_3 A^7 + \ldots \quad (1)$$

If the compression is relatively light, the coefficients $\alpha_2$, $\alpha_3$, and higher are negligibly small, and the power series can be truncated after the cubic term $\alpha_1 A^3$. Therefore, the signal $A_{compressed}$ is approximated by expression (2).

$$A_{compressed} \approx \alpha_0 A - \alpha_1 A^3. \quad (2)$$

Now consider the signal A and another signal B that simultaneously engage an electronic component. If the electronic component is perfectly linear, a resultant signal is a superposition of the signal A and the signal B (i.e., A+B). However, practical electronic components suffer from various degrees of nonlinearity. Therefore, a cubic third-order term $\alpha_1(A+B)^3$ is included in expression (3) to more accurately model the resultant signal $(A+B)_{compressed}$.

$$(A+B) \to (A+B)_{compressed} \approx \alpha_0(A+B) - \alpha_1(A+B)^3. \quad (3)$$

Expanding the (A+B) of the cubic third-order term $\alpha_1(A+B)^3$ into a full polynomial yields the expression (4).

$$(A+B)^3 = A^3 + 3A^2B + 3AB^2 + B^3 \quad (4)$$

If the signal A and the signal B are both sinusoidal the following expressions (5) and (6) are given.

$$A = a \cdot \sin(\omega_1 t + \phi_1) \quad (5)$$

$$B = b \cdot \sin(\omega_2 t + \phi_2), \quad (6)$$

The following trigonometric identities represented by expressions (7), (8), and (9) can be applied to expression (4).

$$\sin^3 x = \tfrac{1}{4}(3 \sin x + \sin 3x) \quad (7)$$

$$\sin^2 x = \tfrac{1}{2}(1 - \cos 2x) \quad (8)$$

$$\sin x \cos y = \tfrac{1}{2}[\sin(x+y) + \sin(x-y)]. \quad (9)$$

Expanding out the third-order polynomial from expression (4) using the sinusoidal signals of expressions (5) and (6), it can be seen that the cubic third order term $\alpha_1(A+B)^3$ results in additional frequency content as shown below in expression (10).

$$[a \cdot \sin(\omega_1 + \phi_1) + b \cdot \sin(\omega_2 + \phi_2)]^3 = \quad (10)$$
$$(3/4a^3 + 3/2ab^2) \cdot \sin(\omega_1 t + \phi_1) +$$
$$(3/4b^3 + 3/2a^2b) \cdot \sin(\omega_2 t + \phi_2) - 1/4a^3 \sin(2\omega_1 t + 3\phi_1) -$$
$$1/4b^3 \sin(3\omega_2 t + 3\phi_2) - 3/2a^2 b \sin([2\omega_1 + \omega_2]t + 2\phi_1 + \phi_2) -$$
$$3/2ab^2 \sin([\omega_1 + 2\omega_2]t + \phi_1 + 2\phi_2) +$$
$$3/2a^2 b \sin([2\omega_1 - \omega_2]t + 2\phi_1 - \phi_2) +$$
$$3/2ab^2 \sin([-\omega_1 + 2\omega_2]t - \phi_1 + 2\phi_2).$$

In addition to the original frequencies, $\omega_1$ and $\omega_2$, the expression (10) demonstrates that compression results in new products at the third harmonic frequencies, $3\omega_1$ and $3\omega_2$, as well as four additional intermodulation frequencies, $2\omega_1 \pm \omega_2$ and $2\omega_2 \pm \omega_1$. These last four intermodulation frequencies are third order intermodulation (IM3) products, and two in particular, $2\omega_1 - \omega_2$ and $2\omega_2 - \omega_1$, tend to be problematic because they are relatively close in frequency to the original signals. As a result, the $2\omega_1 - \omega_2$ and $2\omega_2 - \omega_1$ IM3 products cannot be easily attenuated with a simple low-pass filter. Hereinafter, the IM3 product $2\phi_1 - \omega_2$ is designated as $IM3_{up}$ and the IM3 product $2\omega_2 - \omega_1$ is designated as $IM3_{down}$. The $IM3_{up}$ product has a frequency that is just above the transmit frequencies, while the IM3—down product has a frequency that is just below the transmit frequencies. Furthermore, subsequent references herein to "IM3 products" will refer only to the $IM3_{up}$ product and the $IM3_{down}$ product, as the two additional IM3 products at $2\omega_1 + \omega_2$ and $2\omega_2 + \omega_1$ are not a particular concern of this disclosure.

FIG. 1 is a frequency spectrum for universal mobile telecommunications system (UMTS) band 5 (B5) and evolved UMTS terrestrial radio access (E-UTRA) band 13 (B13). The frequency spectrum of FIG. 1 illustrates the impact of the IM3$_{up}$ and IM3$_{down}$ products generated by the simultaneous transmission of the signals A and B. Nonlinearity of electronic components is especially problematic in the case of SV-LTE because certain transmit channel combinations result in IM3 products that fall directly within the pass bands of the receivers. Therefore, unless such IM3 products can be dramatically reduced, receivers impacted by the IM3 products can be severely de-sensed, and a mobile terminal that incorporates the impacted receivers will become essentially useless as long as the IM3 products are present.

FIG. 2 is a circuit diagram of a structure for a related art RF switch 10 that comprises nonlinear components in the form of field effect transistors (FETs) 12 that are stacked in series for enhanced voltage handling capabilities. The RF switch 10 has a receive/transmit (RX/TX) terminal 14 and an antenna terminal 16. A transceiver (not shown) is typically coupled to the RX/TX terminal 14, and an antenna (not shown) is typically coupled to the antenna terminal 16. The FETs 12 are practically identical with the exception of parasitic compensation (not shown) to maintain an equal voltage drop across each of the FETs 12. To date, the wireless industry has struggled for a solution to the problem of receiver de-sense due to IM3 products generated by nonlinear components such as the FETs 12.

FIG. 3 is a diagram illustrating a related art approach for reducing power in the IM3 products generated by a first nonlinear switch 18 and a second nonlinear switch 20. The first nonlinear switch 18 and the second nonlinear switch 20 each typically have the structure of the related art RF switch 10 (FIG. 2). A first antenna 22 is used for transmission and reception of signals in a first band (B5) and a second antenna 24 is used for transmission and reception of a second band (B13). Since the first antenna 22 and the second antenna 24 can be designed to provide ~10 dB of isolation, the resulting IM3 products can be reduced proportionally. However, even a 10 dB reduction in IM3 products requires a linearity that is on the order of 10-20 dB higher than current state-of-the-art electronic components such as the first nonlinear switch 18 and the second nonlinear switch 20. As such, there remains a need for additional intermodulation suppression to further reduce IM3 products generated by nonlinear electronic components.

SUMMARY

Disclosed is a diplexed transmit (TX) filter and RF switch for suppressing third order intermodulation (IM3) products. Included are first and second duplexers each having a receive (RX) port, a TX port, and an RX/TX port. Also included are first and second power splitter/combiners each having first, second, and third terminals. Further included are first, second, and third phase shift networks along with first and second switch segments. The first power splitter/combiner's first terminal is coupled to the first duplexer's TX port and the first switch segment is coupled between the first duplexer's RX/TX port and the first terminal of the second coupler. The first phase shift network is coupled to the second duplexer's TX port and the second switch segment in series with the second phase shift network is coupled between the second duplexer's RX/TX port and second coupler's second terminal. The third phase shift network is coupled to the second duplexer's RX terminal.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 6A:
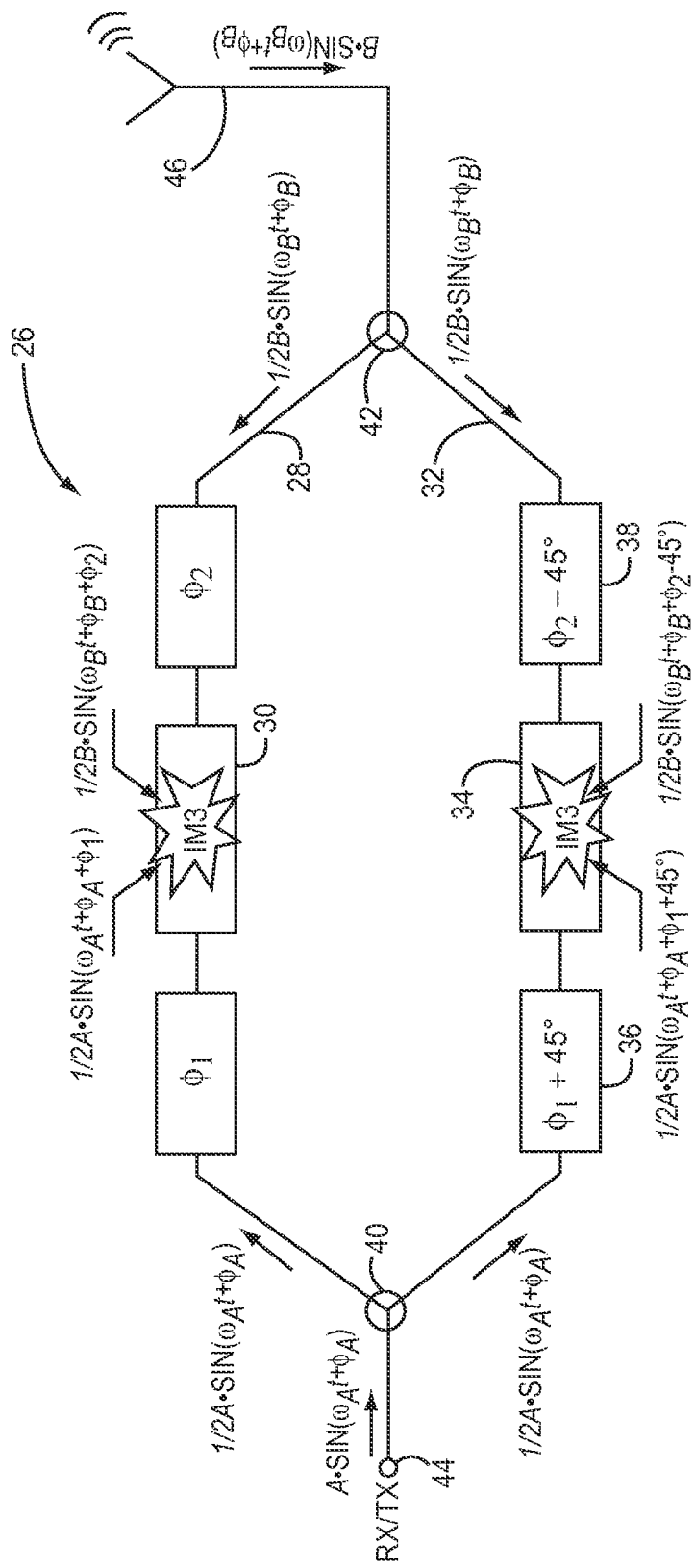
Figure 6B:
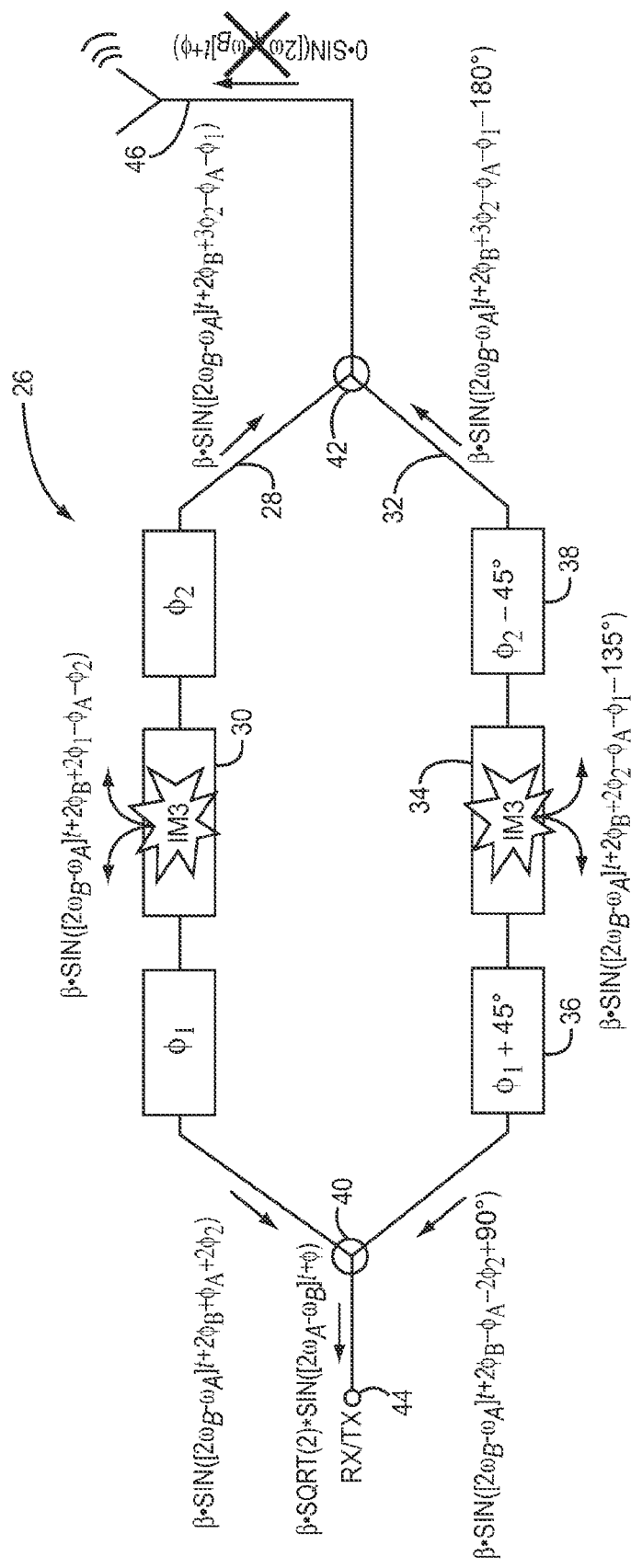
Figure 6C:
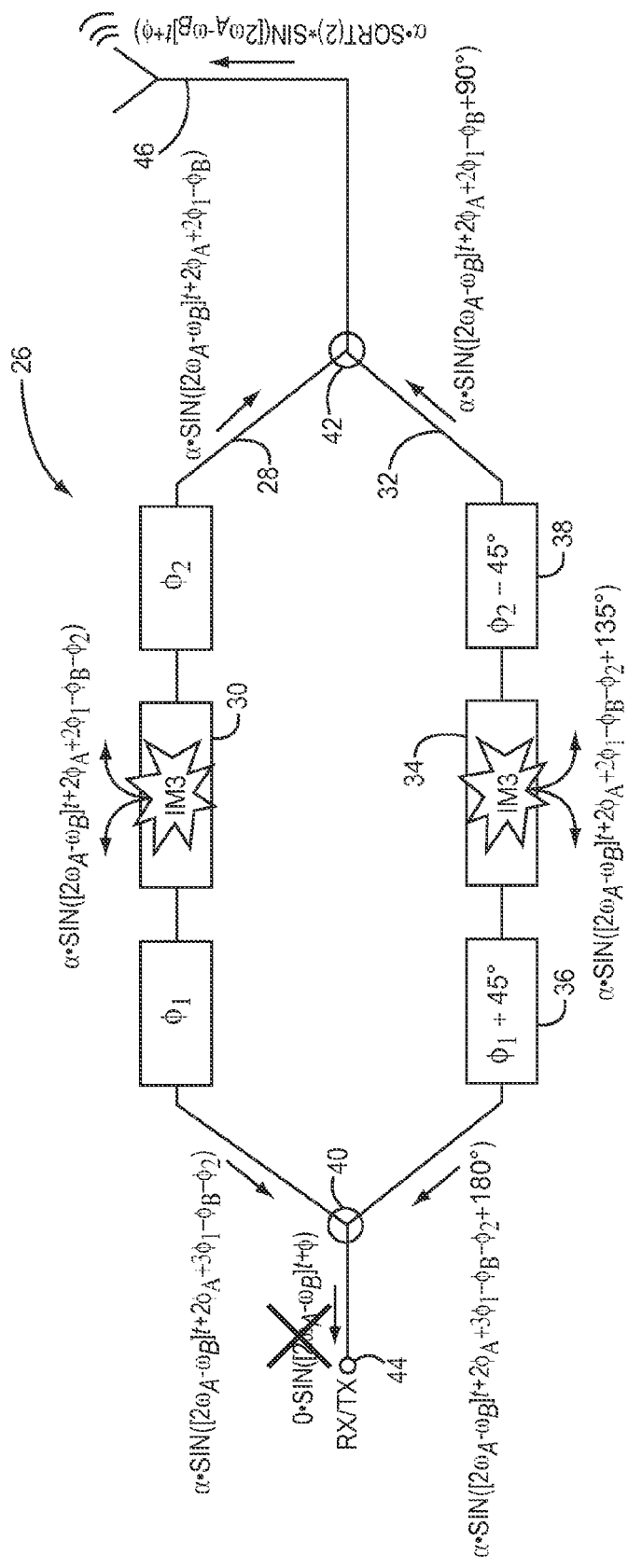

FIGS. 6A-C are switch diagrams that illustrate a suppression of IM3 products wherein a magnitude of the positive offset angle and a negative offset angle is equal to 45°.

Figure 7A:
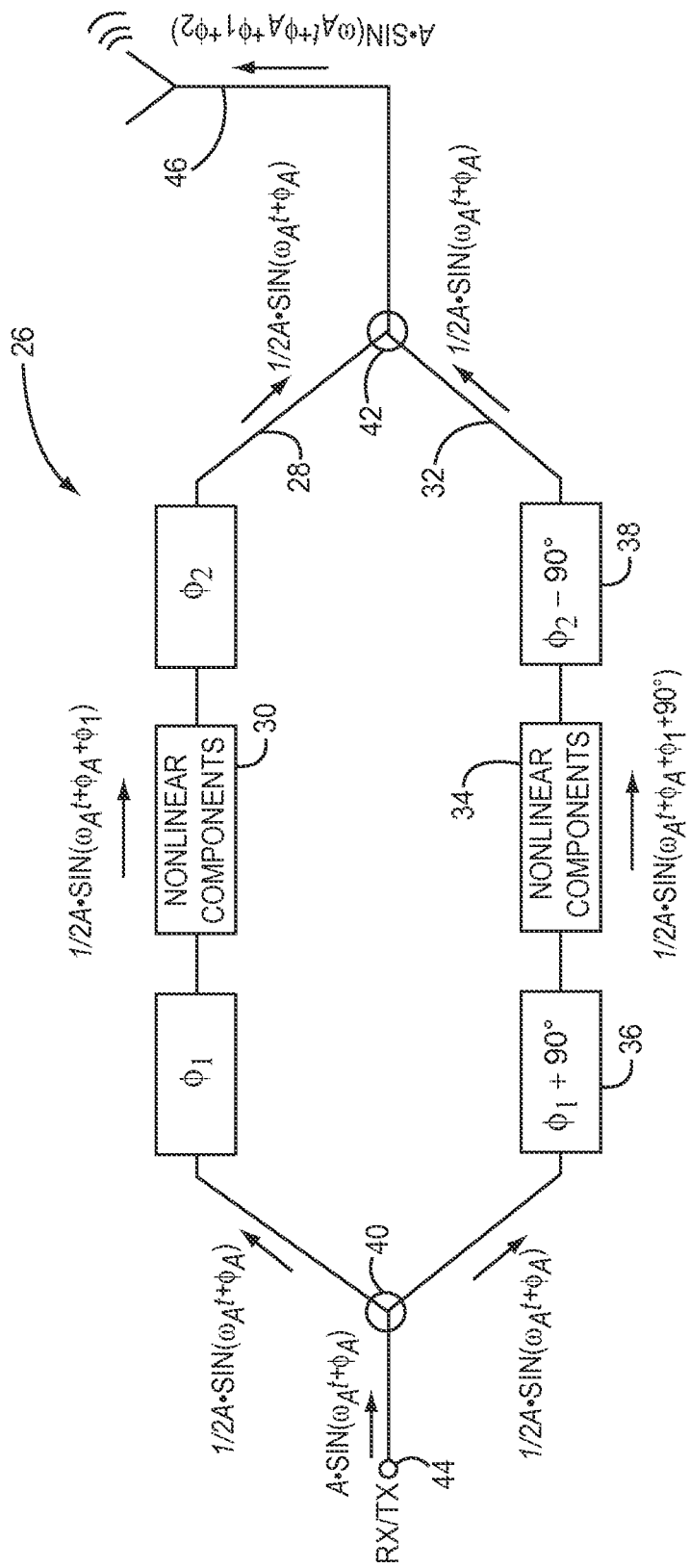

FIG. 7A is a switch diagram illustrating a transmit (TX) signal propagating through the RF switch of the present disclosure wherein a magnitude of the positive offset angle and a negative offset angle is equal to 90°.

Figure 7B:
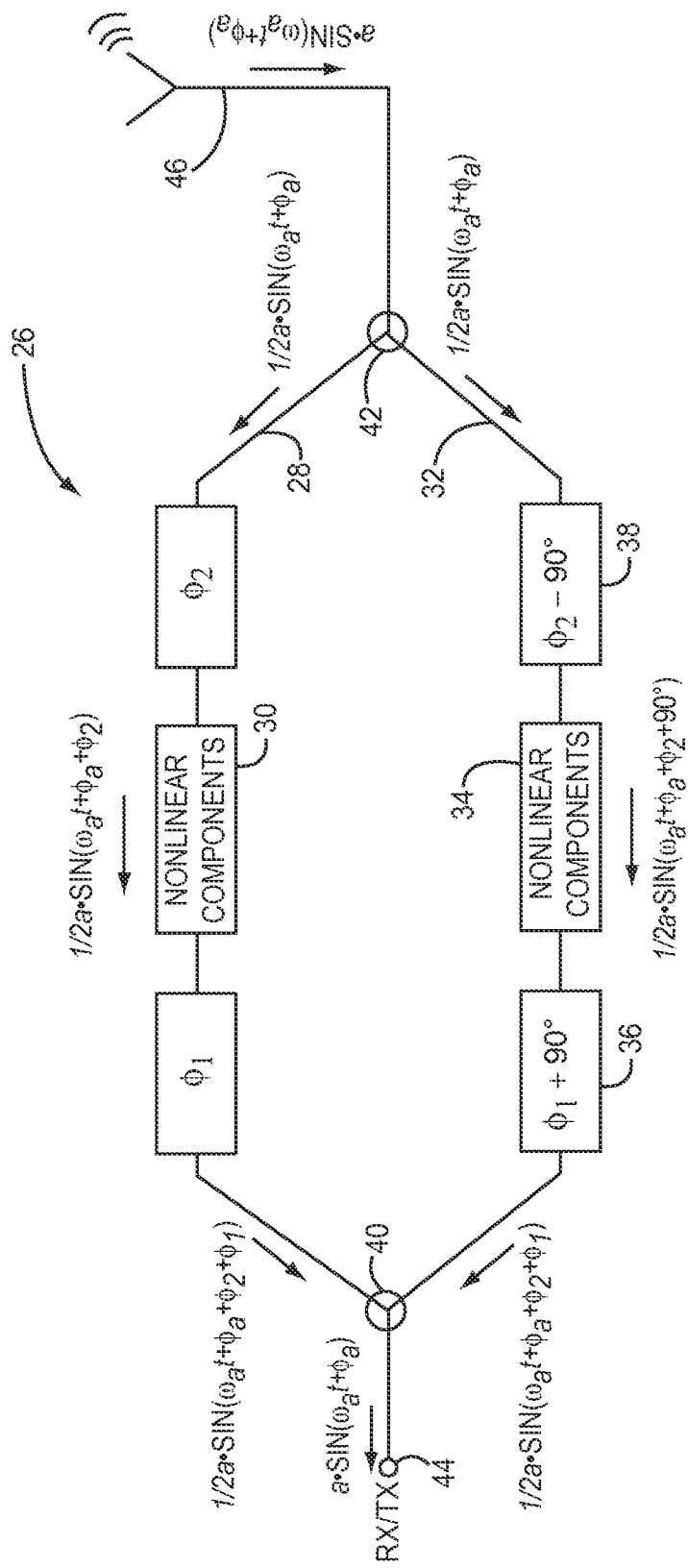

FIG. 7B is a switch diagram illustrating a receive (RX) signal propagating through the RF switch of the present disclosure wherein a magnitude of the positive offset angle and a negative offset angle is equal to 90°.

Figure 8A:
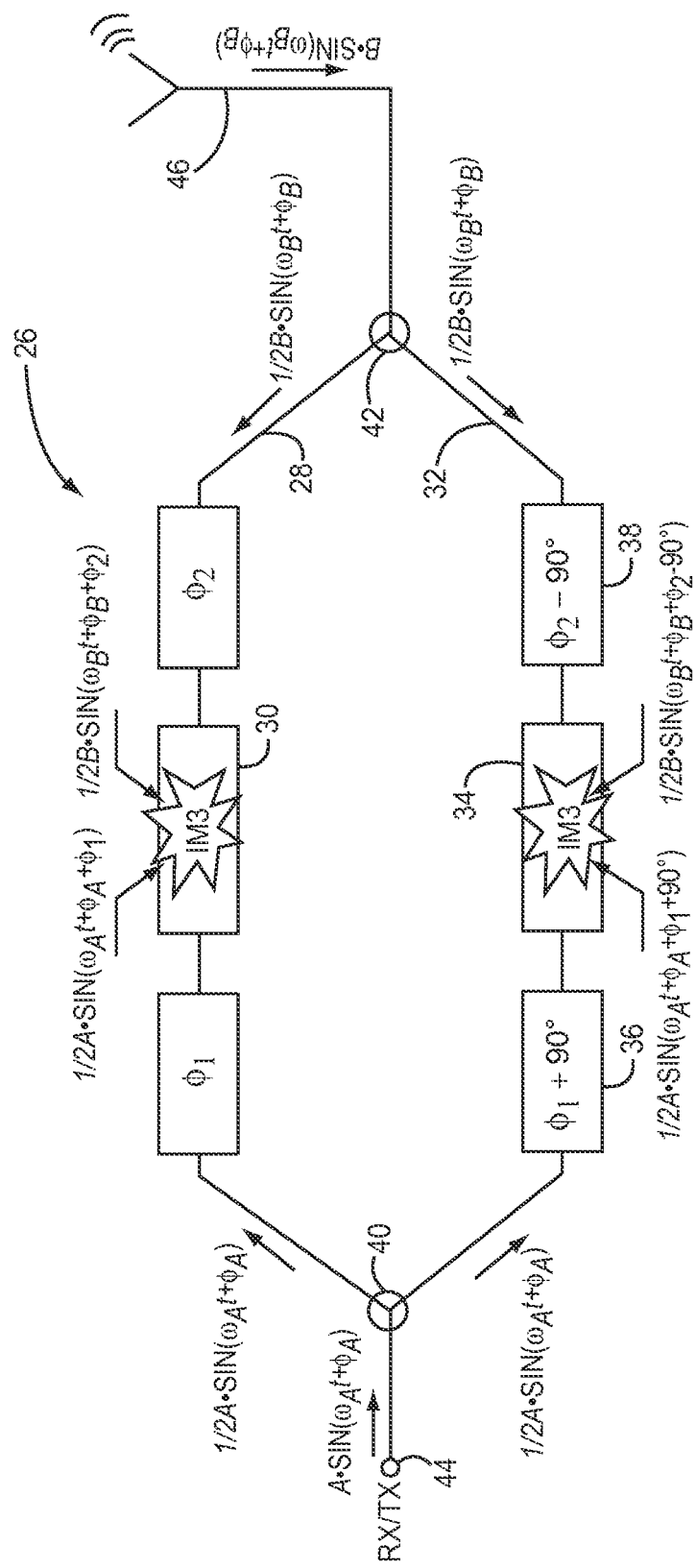
Figure 8B:
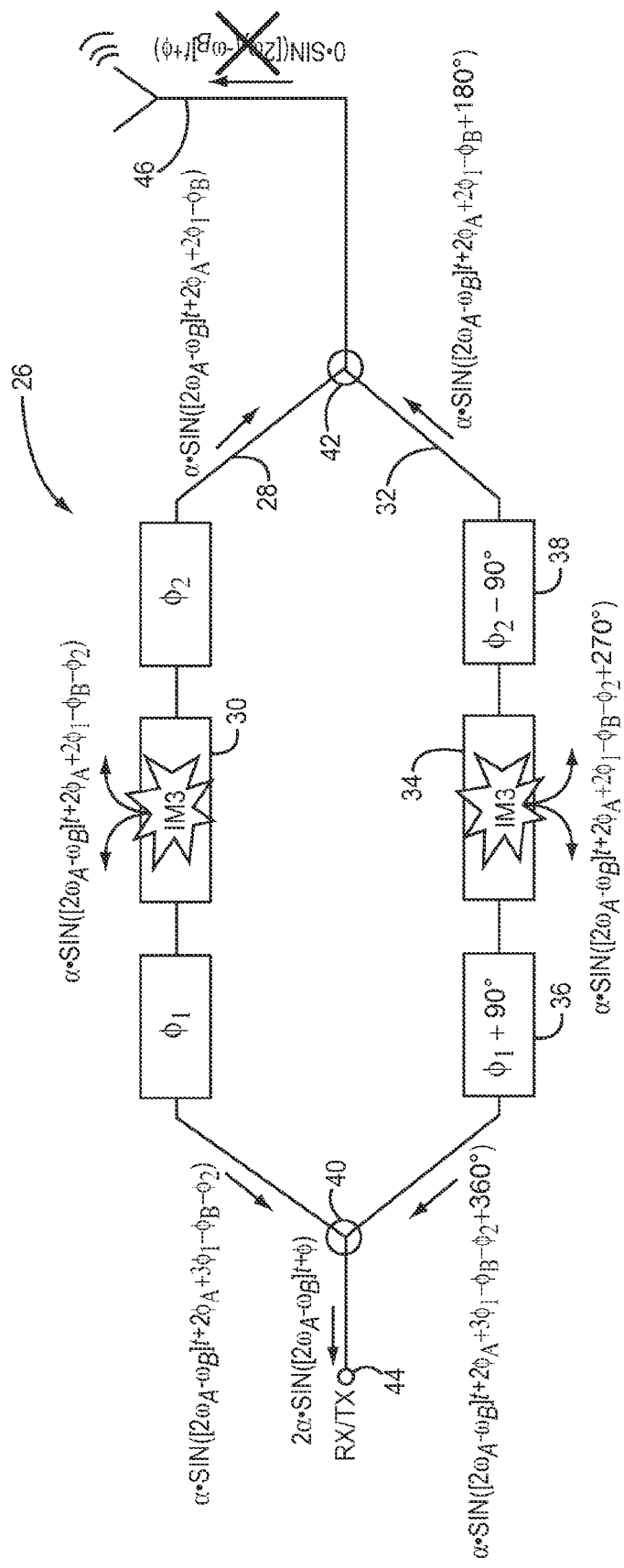
Figure 8C:
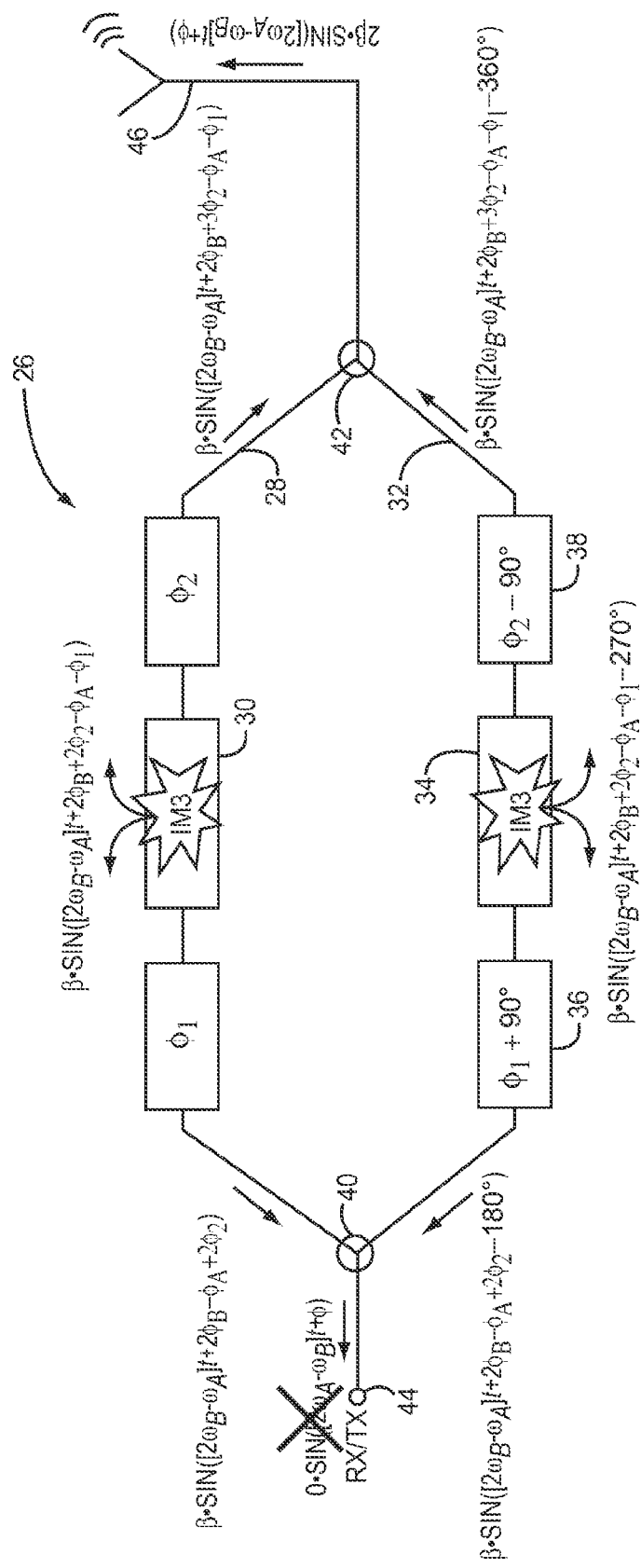

FIGS. 8A-C are switch diagrams that illustrate a suppression of IM3 products wherein a magnitude of the positive offset angle and a negative offset angle is equal to 90°.

Figure 9:
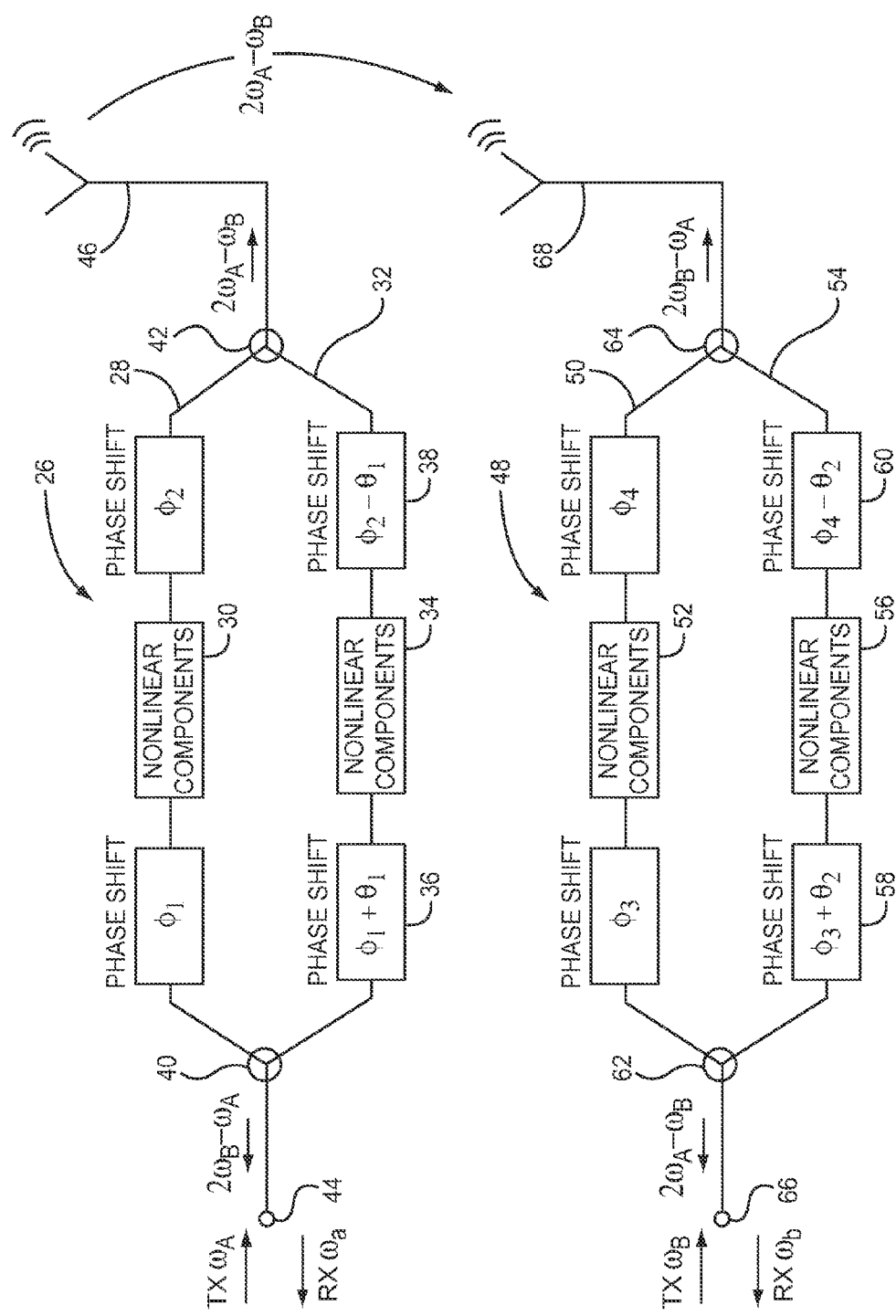

FIG. 9 is a circuit diagram that depicts an RF switch pair having phase angle magnitudes of $\Theta_1$ and $\Theta_2$ according to the present disclosure.

Figure 10:
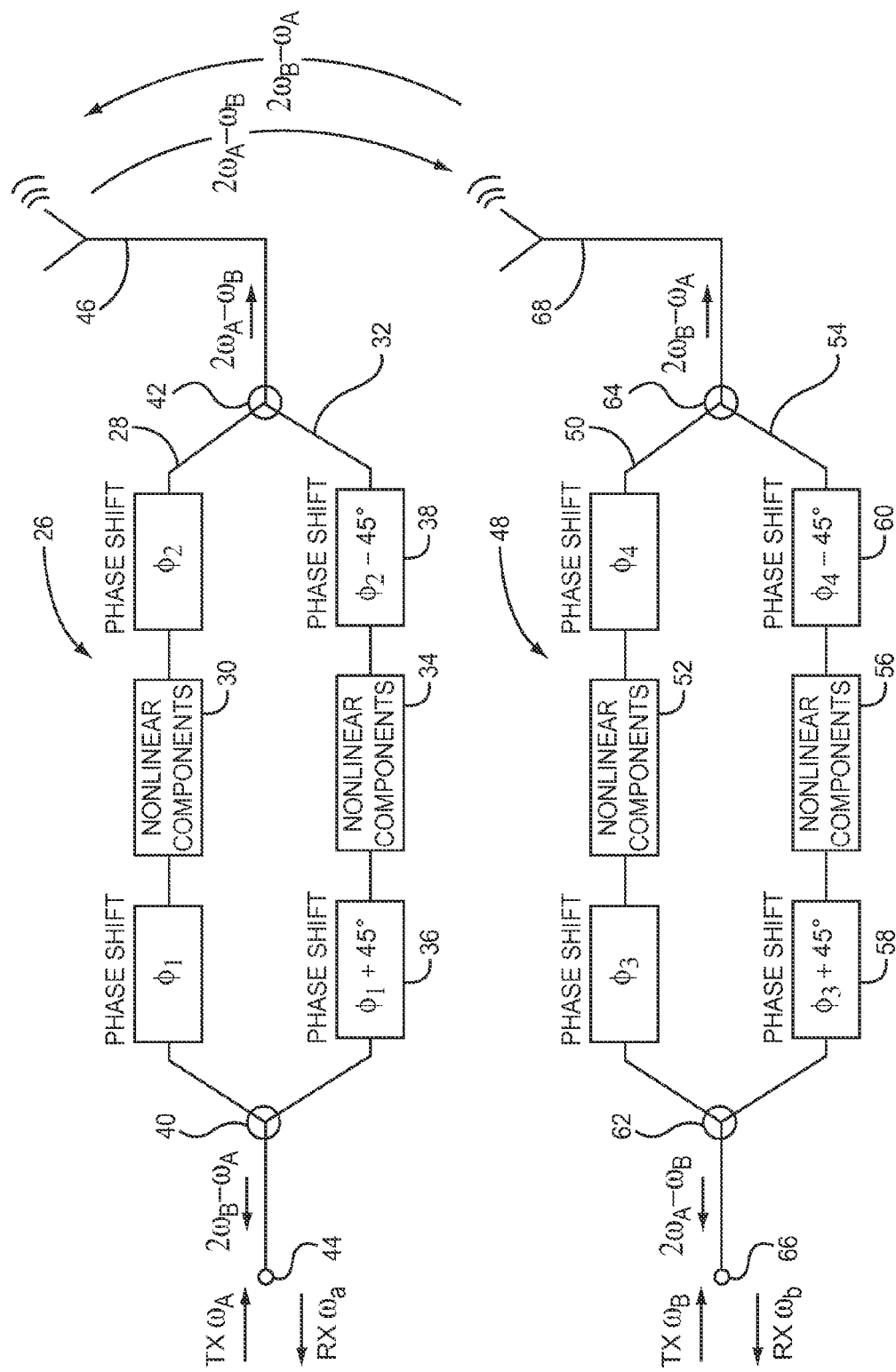

FIG. 10 is a circuit diagram that depicts the RF switch pair wherein the phase angle magnitudes of $\Theta_1$ and $\Theta_2$ both equal 45°.

Figure 11:
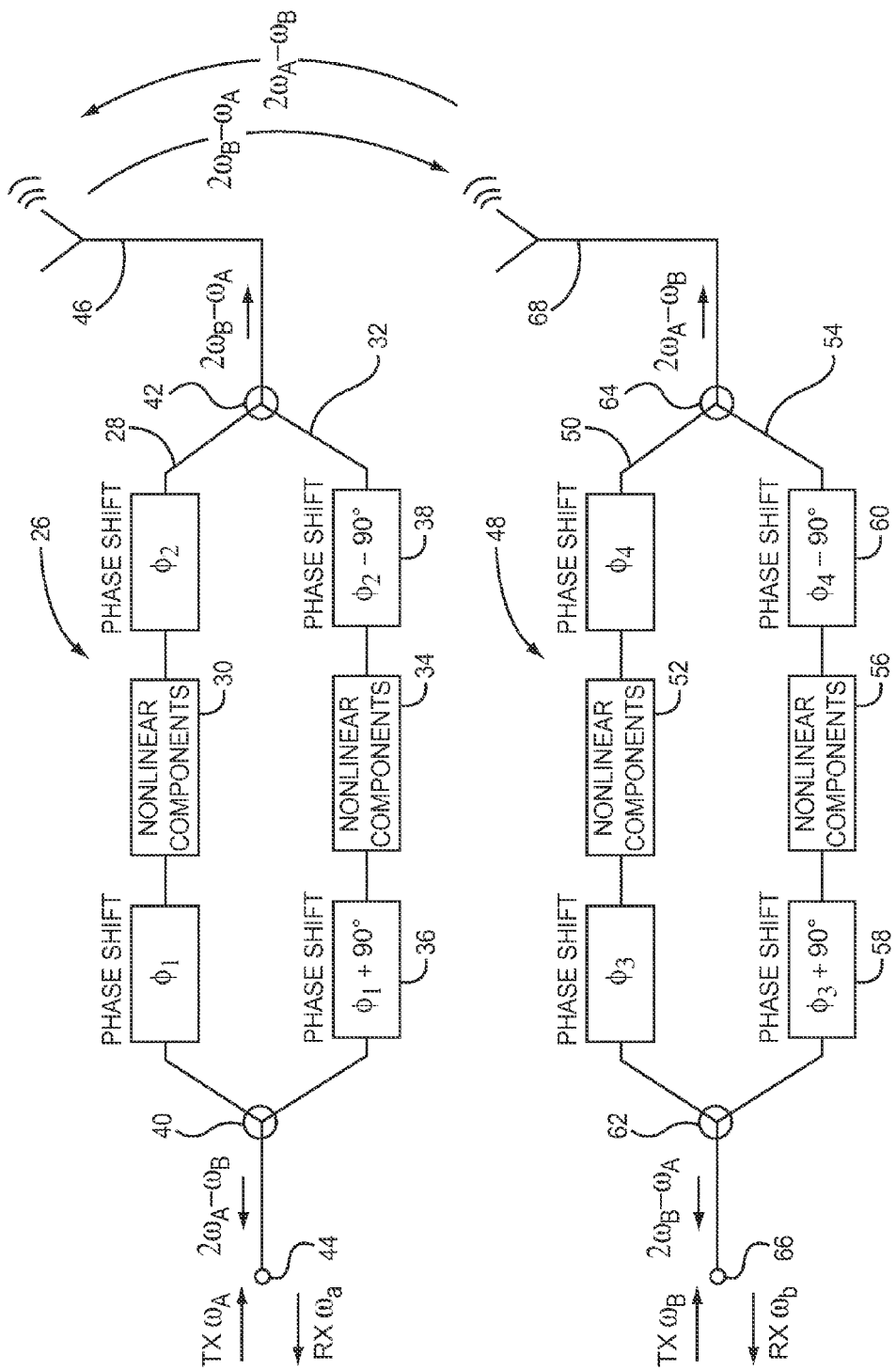

FIG. 11 is a circuit diagram that depicts the RF switch pair wherein the phase angle magnitudes of $\Theta_1$ and $\Theta_2$ both equal 90°.

Figure 12:
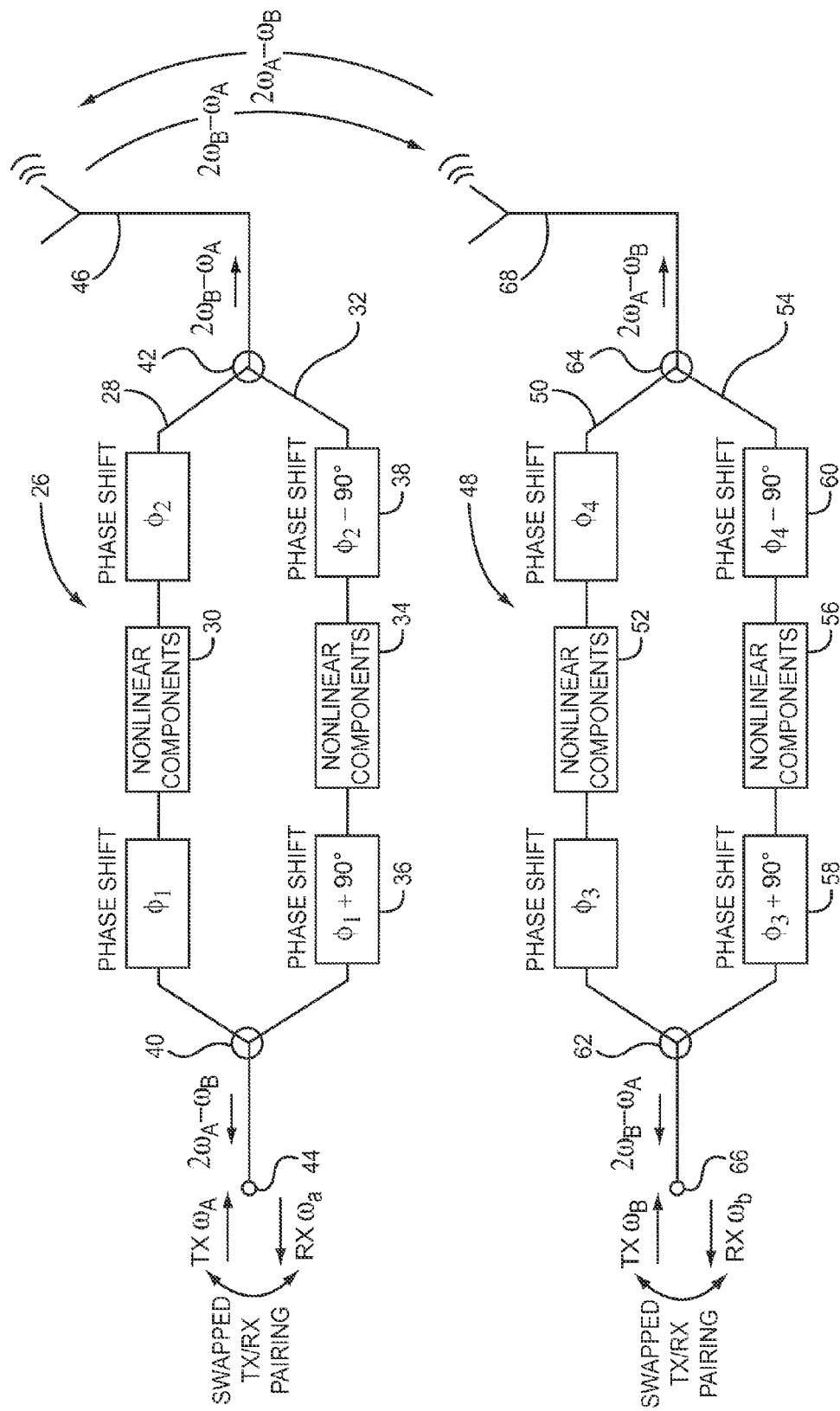

FIG. 12 is a circuit diagram that depicts the RF switch pair wherein the phase angle magnitudes of $\Theta_1$ and $\Theta_2$ both equal 90° wherein transmit/receive (TX/RX) pairing is swapped between the RF switch pair.

Figure 13:
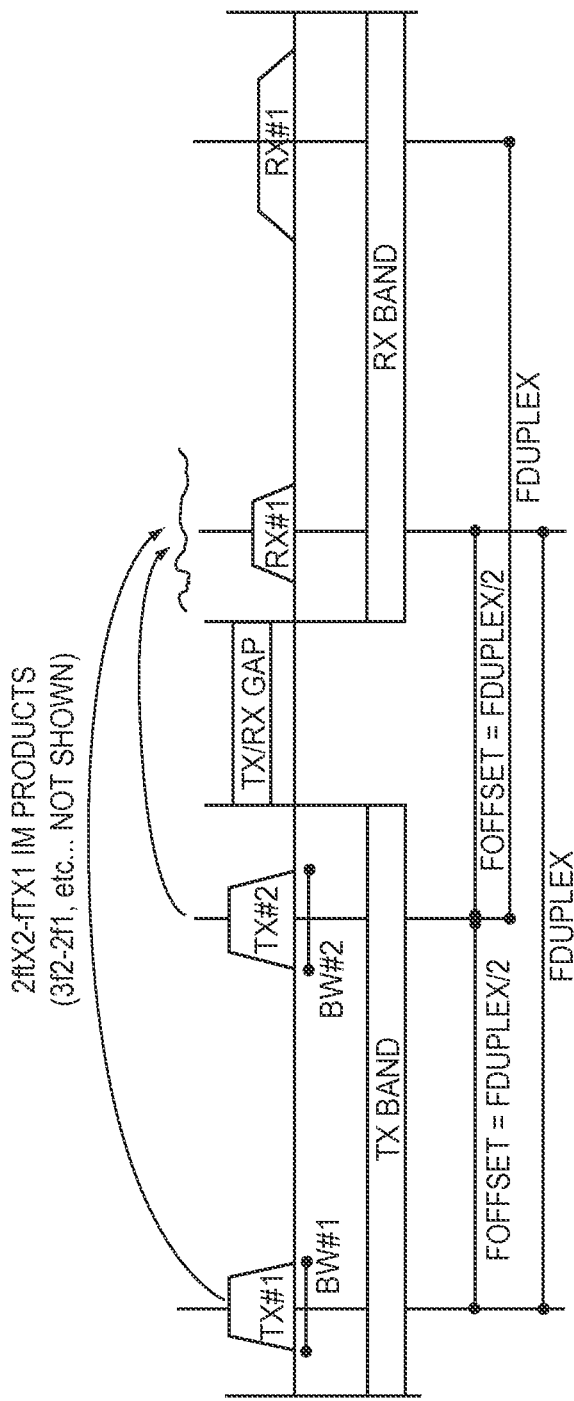

FIG. 13 is a spectrum diagram illustrating LTE-Advanced dual TX carriers creating IM3 products that fall within an RX duplexed channel.

Figure 14:
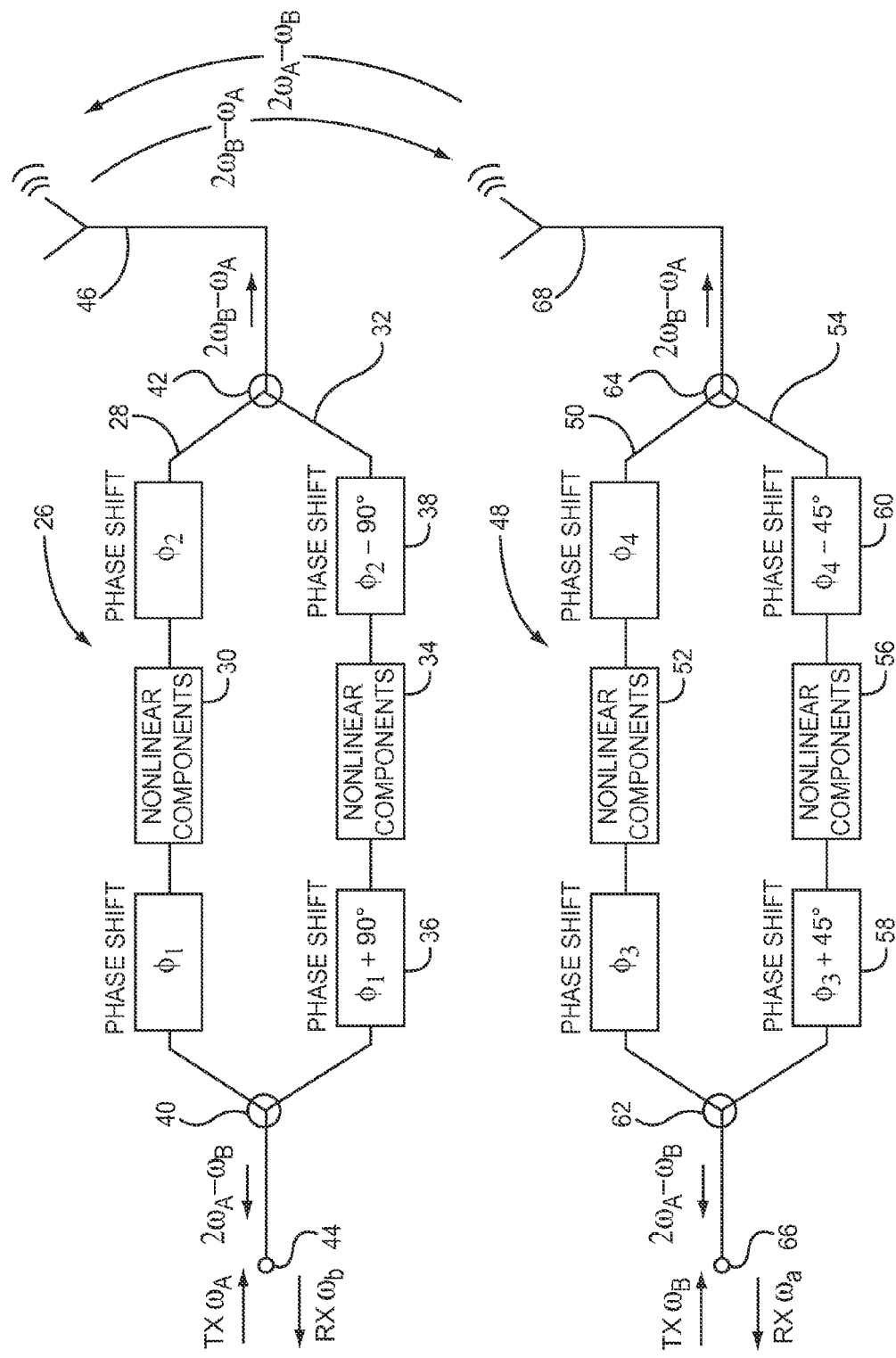

FIG. 14 is a circuit diagram that depicts the RF switch pair wherein the phase angle magnitude of $\Theta_1$ is 90° and the phase angle magnitude $\Theta_2$ is 45°.

Figure 15A:
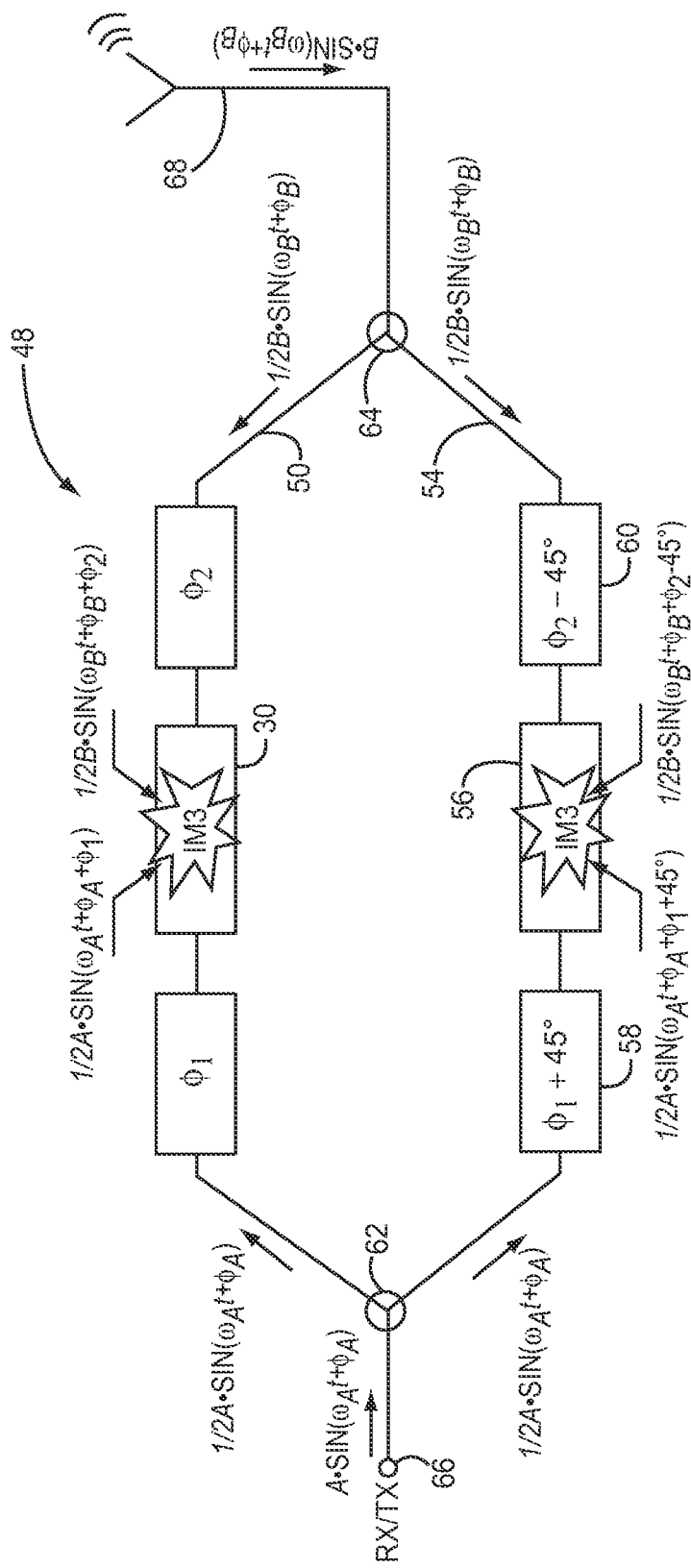
Figure 15B:
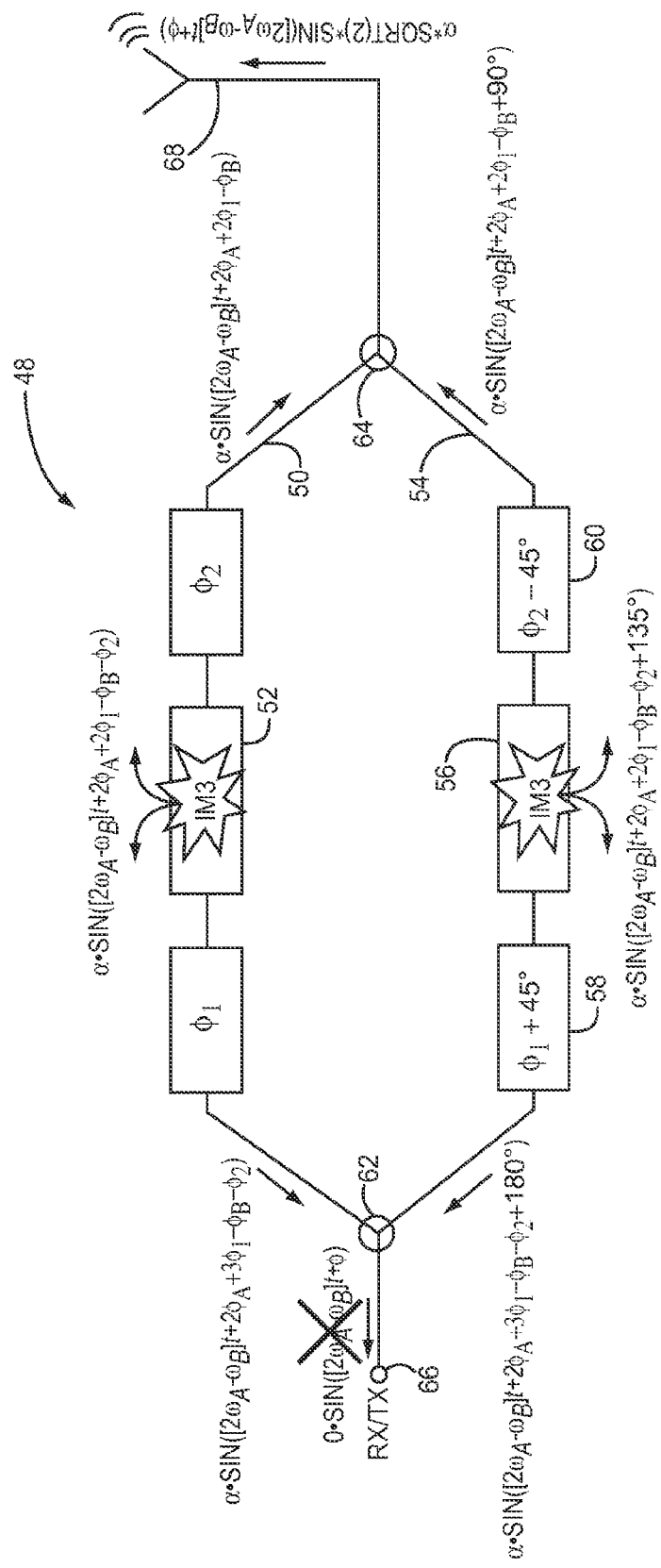
Figure 15C:
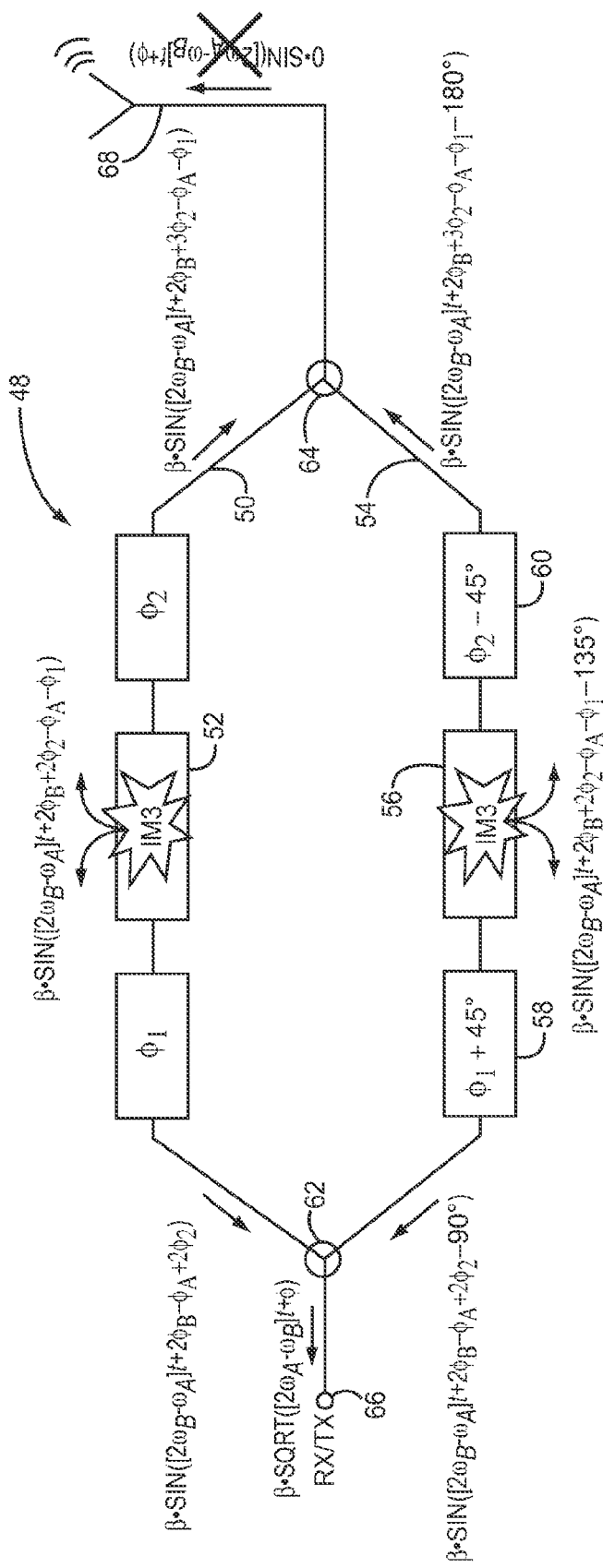

FIGS. 15A-15C are switch diagrams illustrating that a radiated IM3 product is reduced in magnitude due to a power split.

Figure 16:
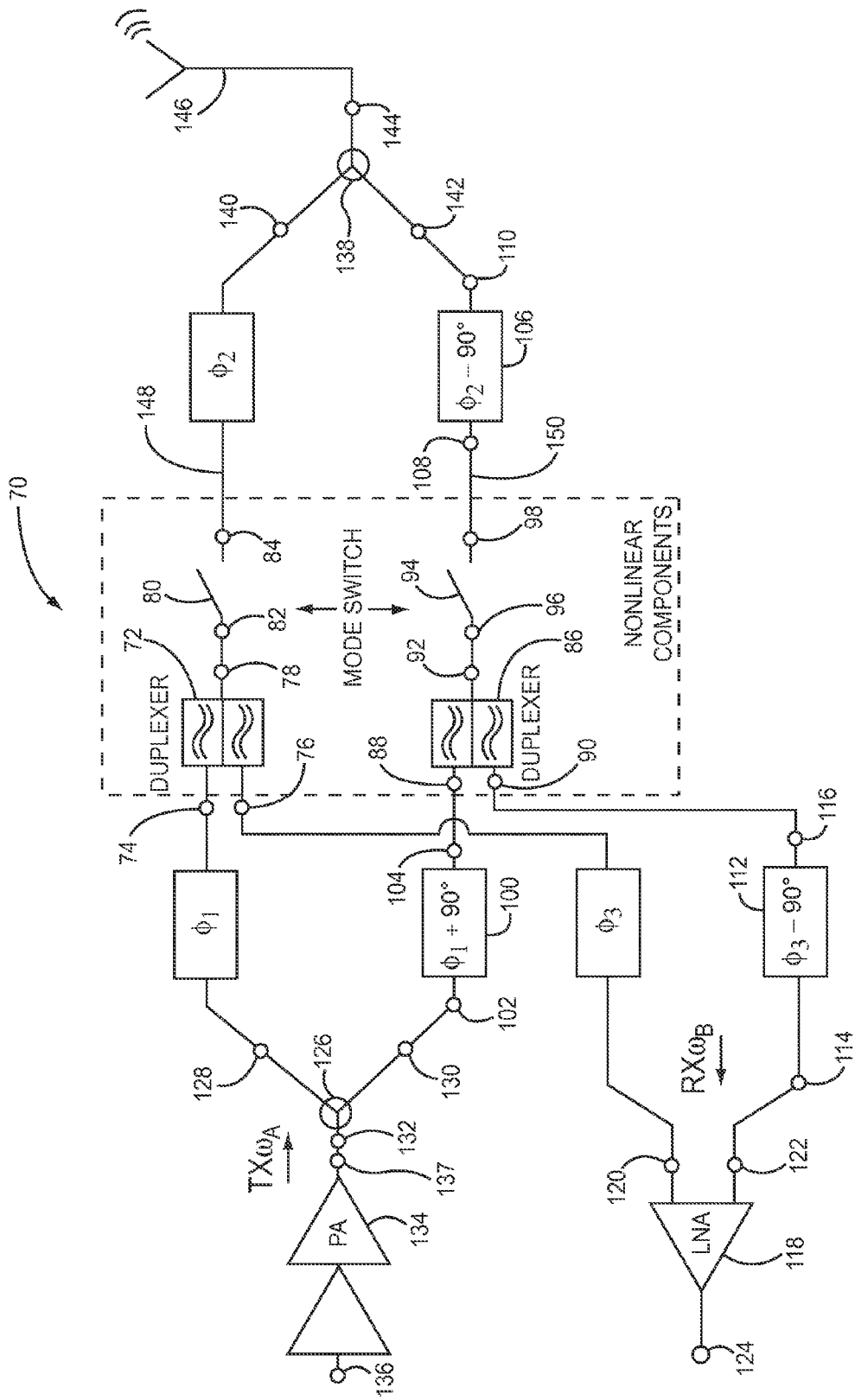

FIG. 16 is a circuit diagram that depicts an alternate embodiment of the RF switch of the present disclosure.

Figure 17A:
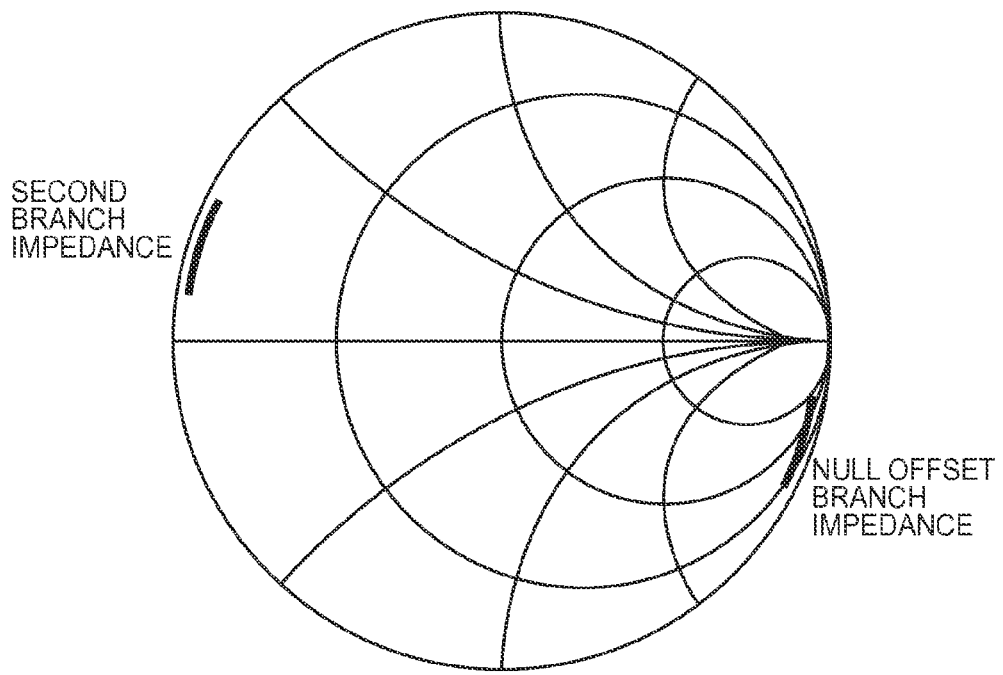

FIG. 17A is a Smith Chart illustrating an effect of having no phase rotation for the phase shift networks.

Figure 17B:
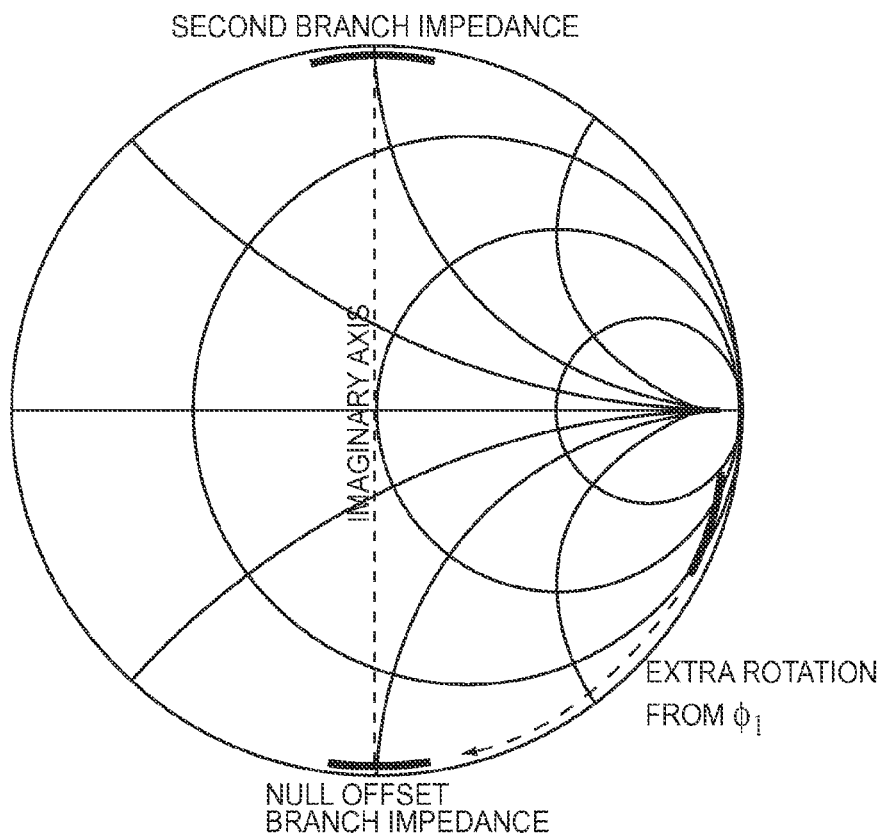

FIG. 17B is a Smith Chart illustrating an effect of adding phase rotation to the phase shift networks.

Figure 18A:
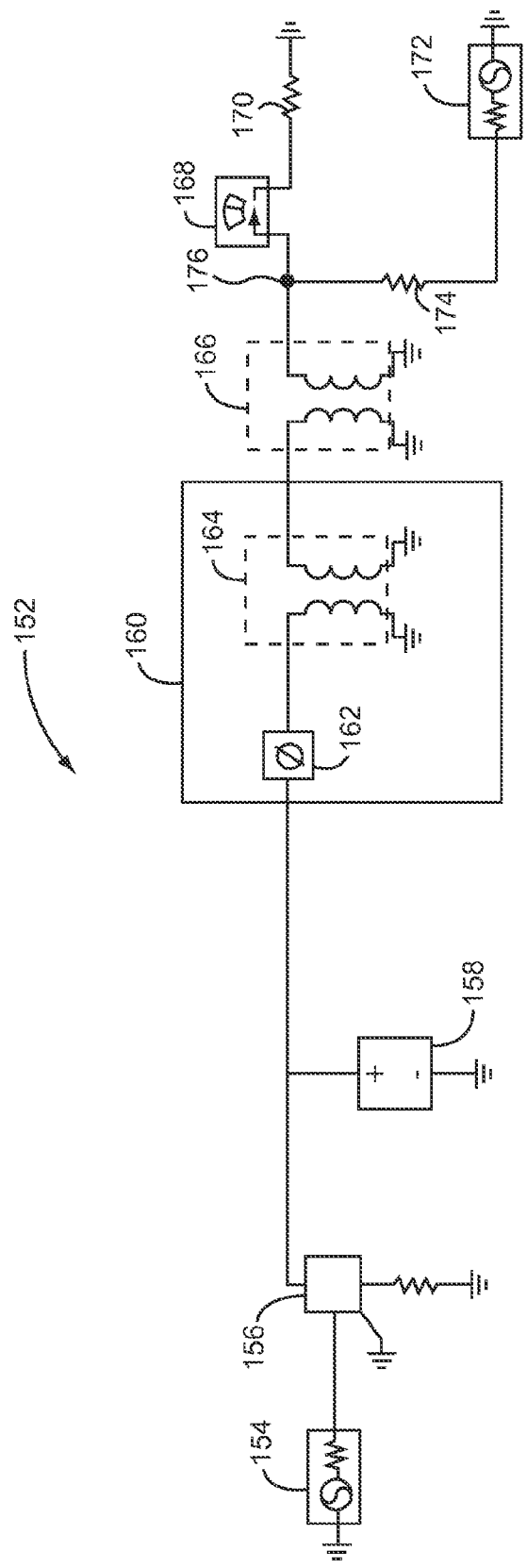

FIG. 18A is a simulator configuration that is adapted to simulate a related art RF switch and duplexer.

Figure 18B:
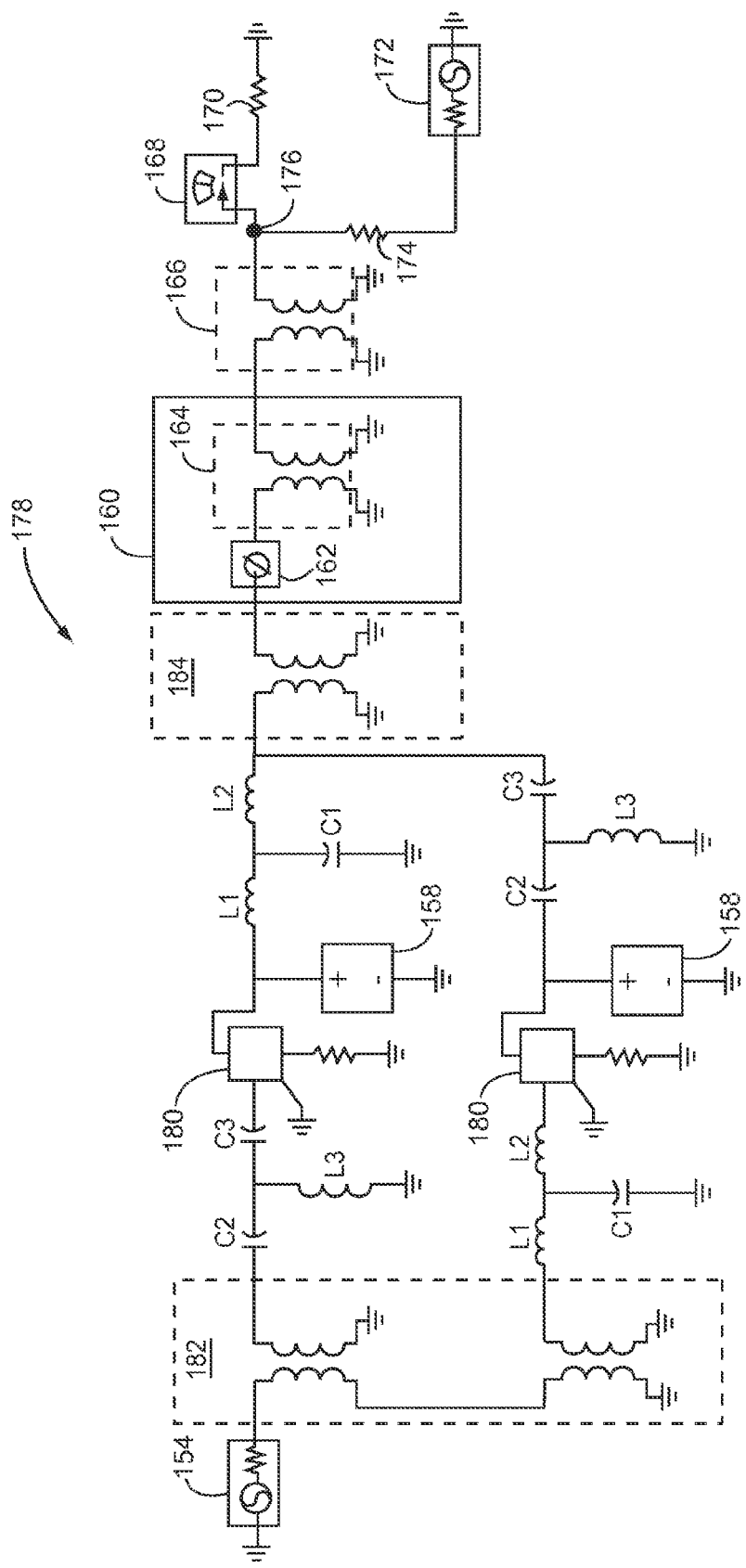

FIG. 18B is a simulator configuration that is adapted to simulate an embodiment of the present disclosure.

Figure 19A:
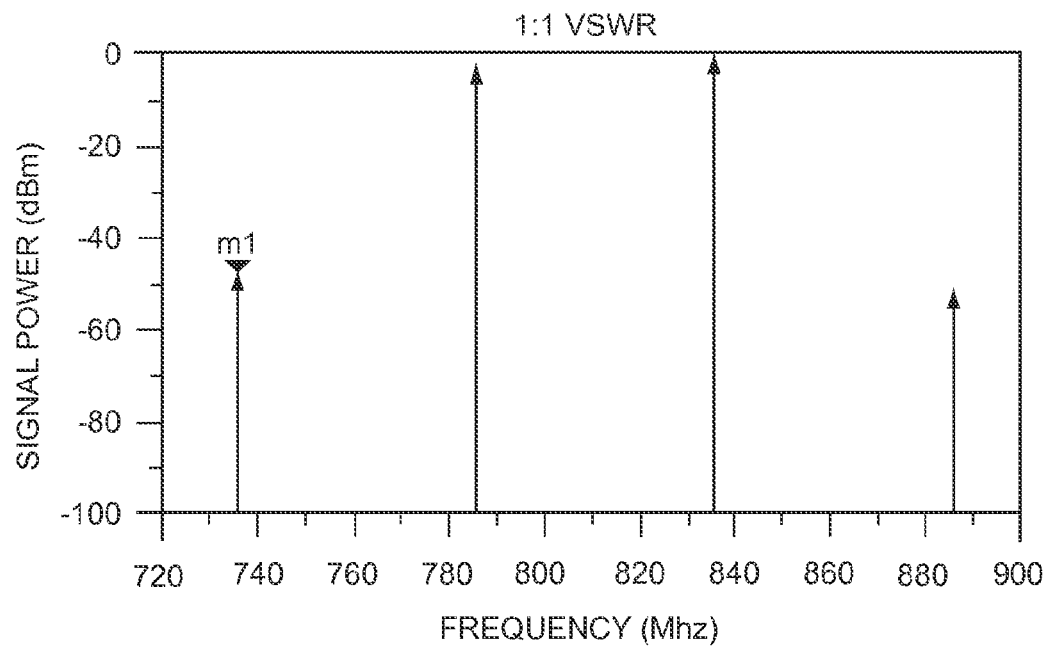

FIG. 19A is a graph of spectrum results for a simulation of a related art RF Switch and duplexer operated at a 1:1 voltage standing wave ration (VSWR).

Figure 19B:
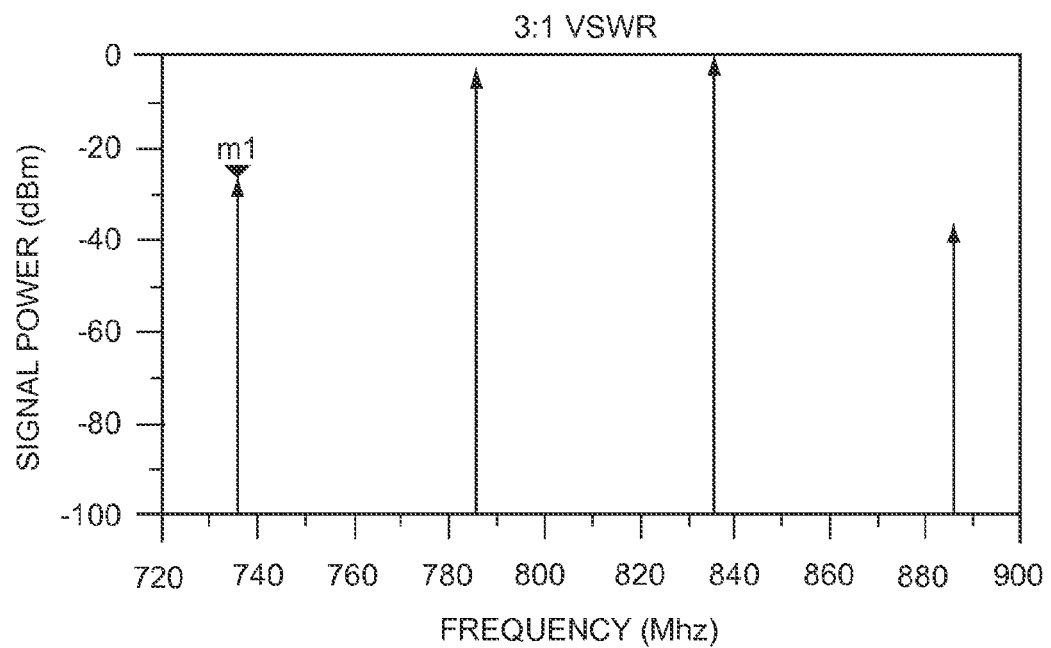

FIG. 19B is a graph of spectrum results for a simulation of a related art RF Switch and duplexer operated at a 3:1 VSWR.

Figure 19C:
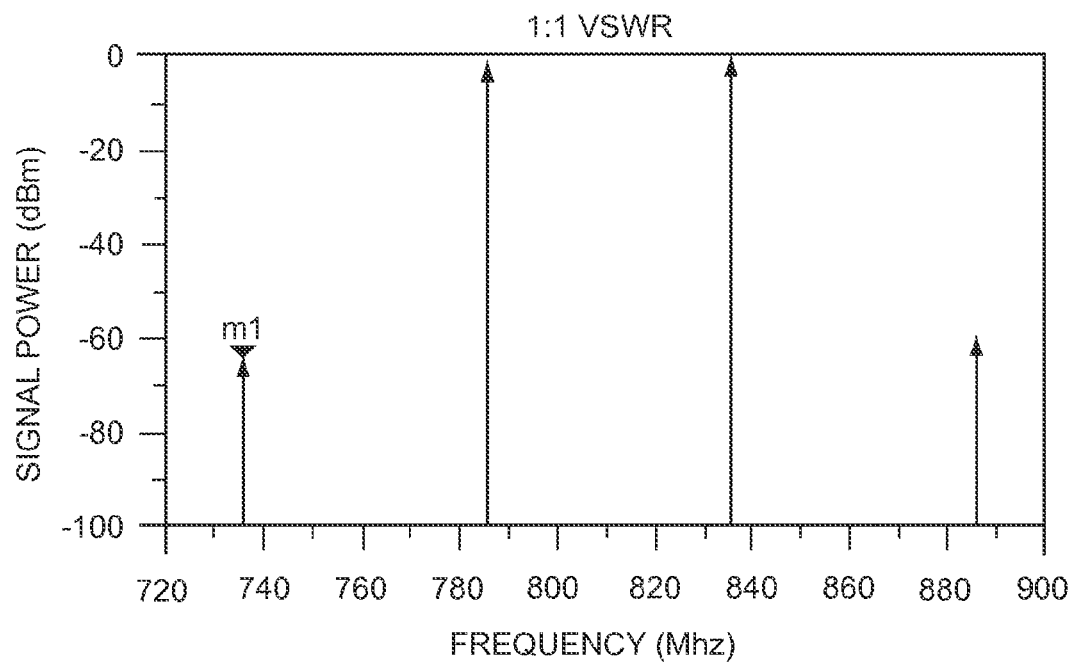

FIG. 19C is a graph of spectrum results for a simulation of an embodiment of the present disclosure operated at a 1:1 VSWR.

Figure 19D:
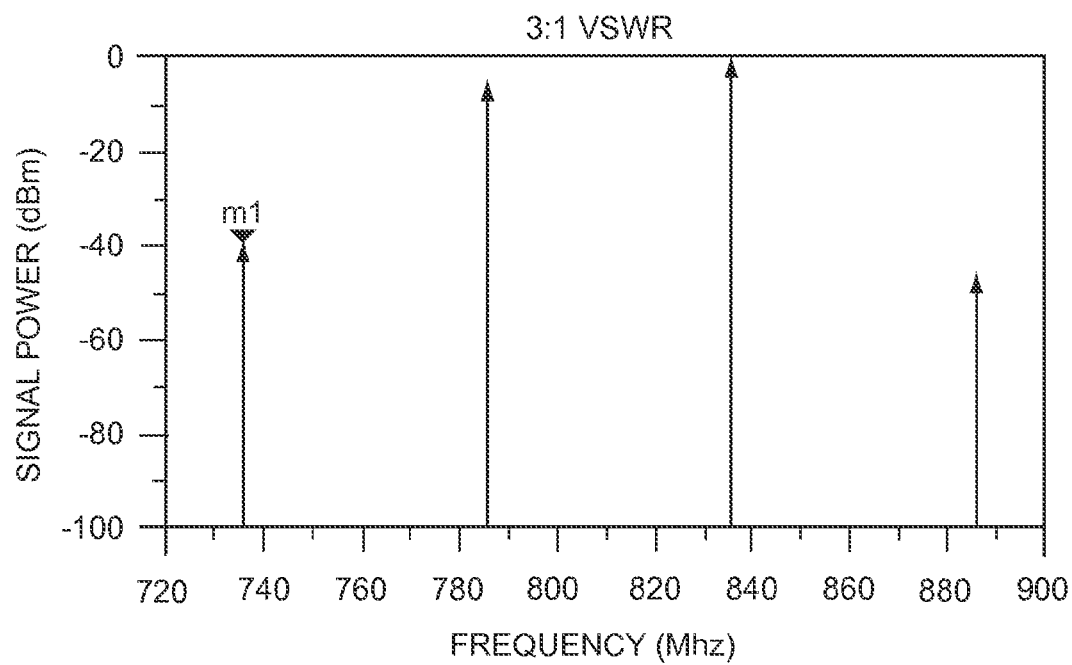

FIG. 19D is a graph of spectrum results for a simulation of an embodiment of the present disclosure operated at a 3:1 VSWR.

Figure 20:
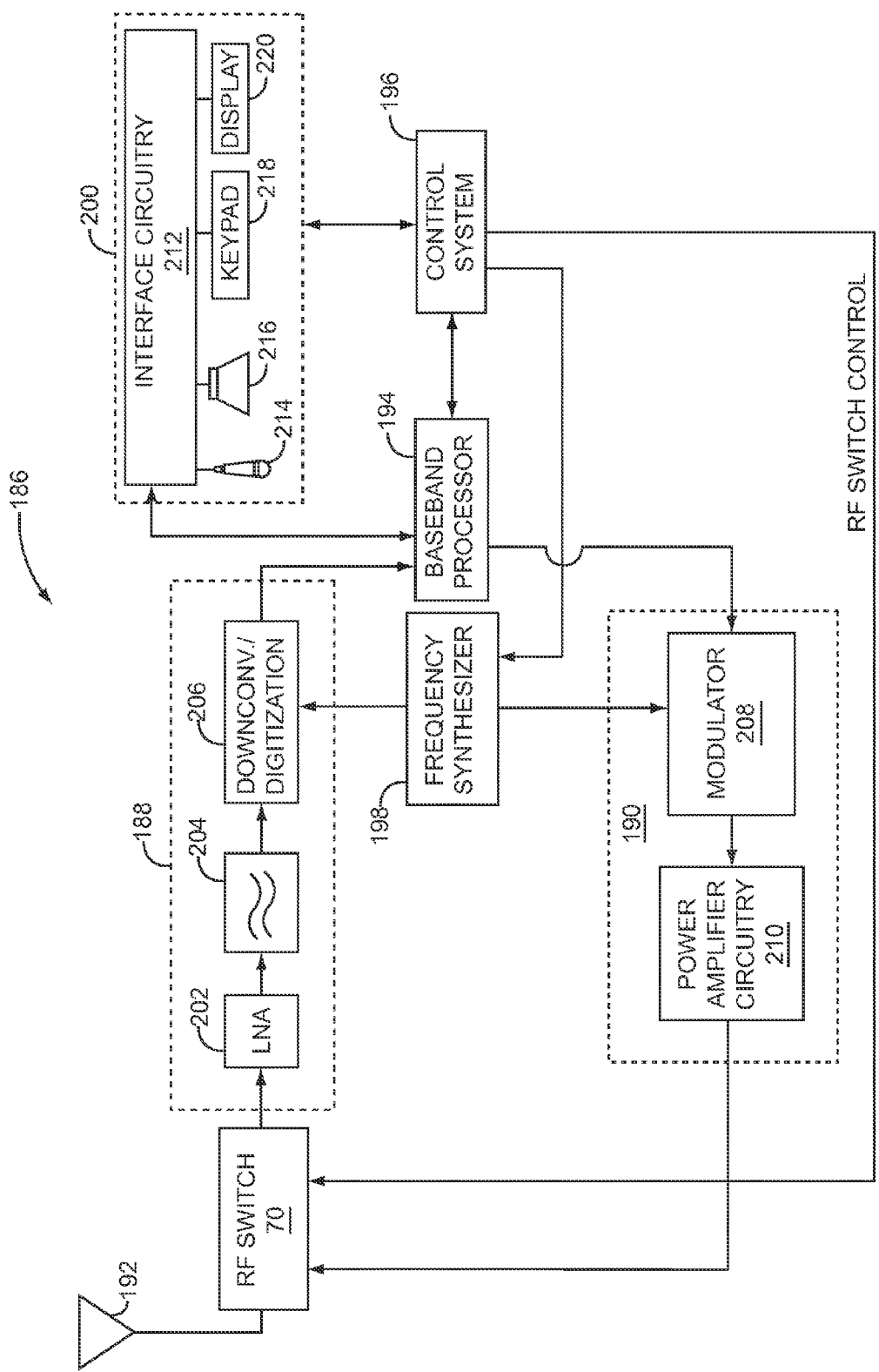

FIG. 20 is a block diagram of a mobile terminal that incorporates the diplexed TX filter and RF switch of the present disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 4:
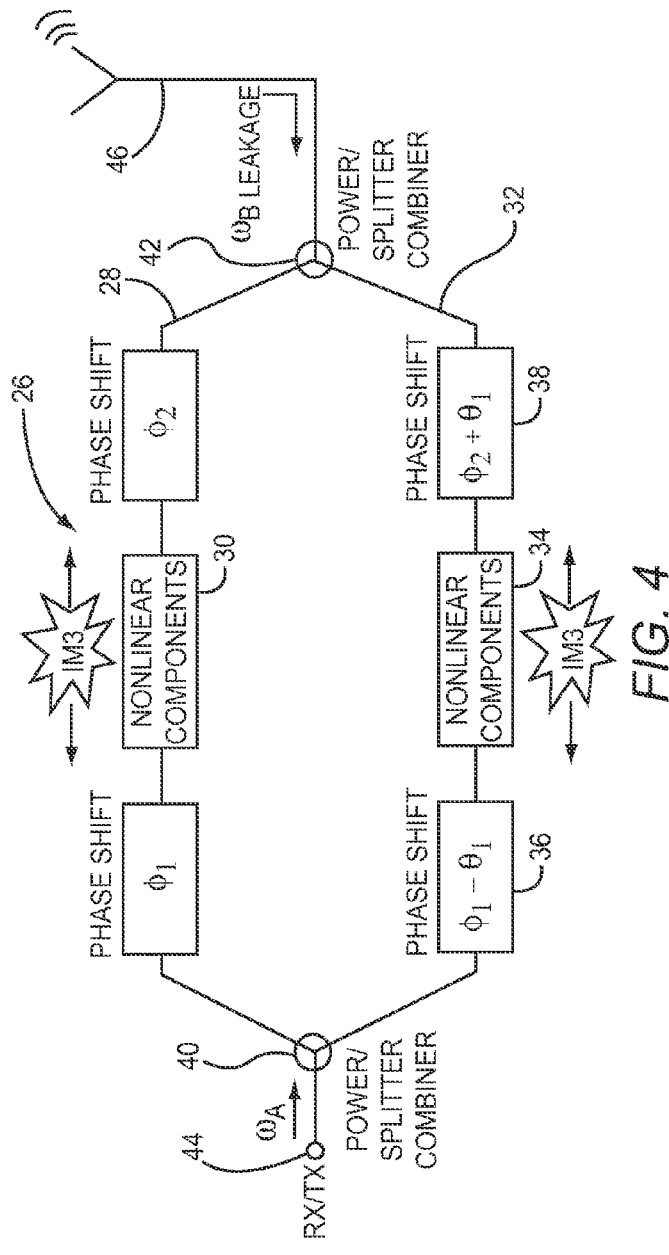
FIG. 4 is a diagram illustrating an embodiment of an RF switch that in accordance with the present disclosure provides IM3 suppression generated by signals propagating through the RF switch.

FIG. 4 is a switch diagram of an embodiment according to the present disclosure that provides an RF switch 26 for suppressing third-order intermodulation (IM3) products that are generated as RF signals propagate through the RF switch 26. The RF switch 26 includes a null offset branch 28 having a first switch segment 30. Signals propagating through the RF switch 26 acquire a first inherent phase shift $\phi_1$ and a second inherent phase shift $\phi_2$ from inductive, resistive and capacitive parasitic elements associated with transmission lines (not shown) that are signal paths through the RF switch 26. A second branch 32 includes a second switch segment 34, a positive phase shift network 36 for shifting the IM3 products through the second branch 32 by a positive offset angle $+\Theta_1$ added to the first inherent phase shift $\phi_1$. The second branch 32 also includes a negative phase shift network 38 for shifting the IM3 products through the second branch 32 by a negative offset angle $-\Theta_1$ added to the second inherent phase shift $\phi_2$. The null offset branch 28 and the second branch 32 are adapted to be coupled between a first power/splitter combiner 40 and a second power splitter/combiner 42. A receive/transmit (RX/TX) terminal 44 is communicatively coupled to the first power splitter/combiner 40 and an antenna 46 is coupled to the second power splitter/combiner 42.

Figure 5A:
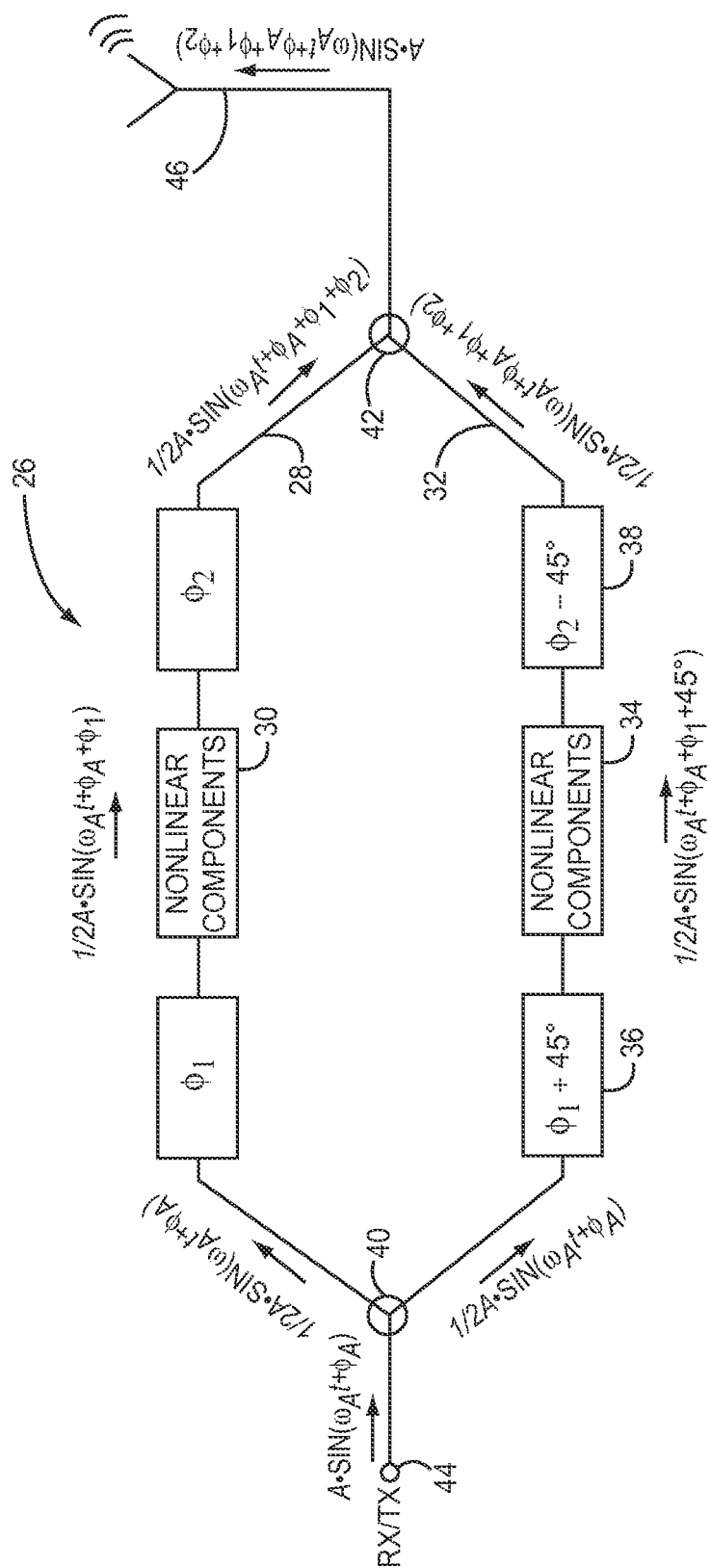
FIG. 5A is a switch diagram illustrating a transmit (TX) signal propagating through the RF switch of the present disclosure.

FIG. 5A is a switch diagram illustrating a transmit (TX) signal propagating through the RF switch 26. In an exemplary TX case, a magnitude of the positive offset angle $+\Theta_1$ (FIG. 4) and a magnitude of the negative offset angle $-\Theta_1$ (FIG. 4) is equal to 45°. Moreover, in the exemplary TX case, the TX signal is a sinusoidal signal in the form $A \cdot \sin(\omega_A t + \phi_A)$, where A is amplitude, $\omega_A t$ is an angular frequency term, and $\phi_A$ is a phase angle. The TX signal propagates through the RX/TX terminal 44 and into the first power splitter/combiner 40 where the TX signal is split into two equal portions that are $A/2 \cdot \sin(\omega_A t + \phi_A)$. Each of the two equal portions of the TX signal propagates through a corresponding one of the null offset branch 28 and the second branch 32. Moreover, each of the two equal portions of the TX signal acquire the first inherent phase shift $\phi_1$ and the second inherent phase shift $\phi_2$ before recombining in the second power splitter/combiner 42. A recombined TX signal has the form $A \cdot \sin(\omega_A t + \phi_A + \phi_1 + \phi_2)$ that is transmitted from the antenna 46. The additional phase shifts of the first inherent phase shift $\phi_1$ and the second inherent phase shift $\phi_2$ do not affect communication of the TX signal.

Figure 5B:
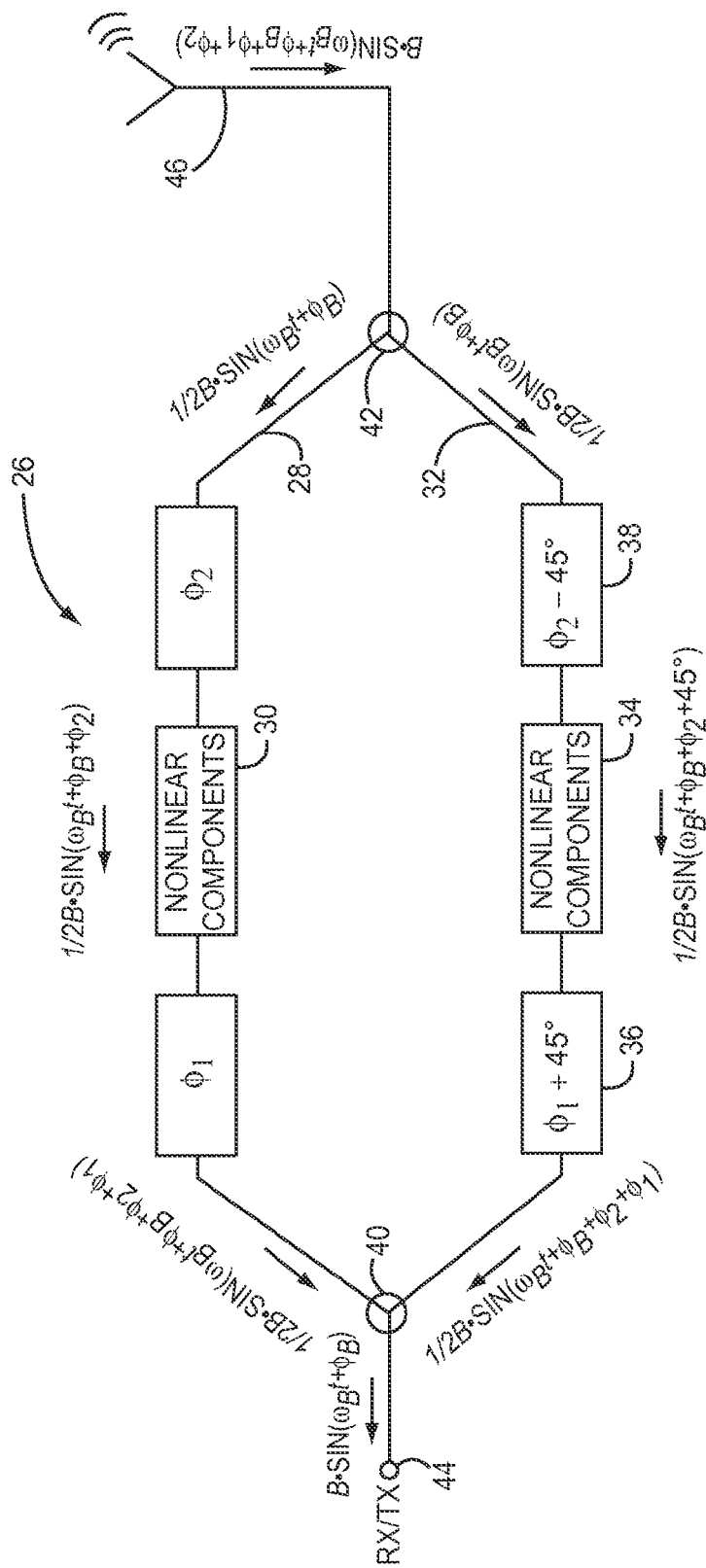
FIG. 5B is a switch diagram illustrating a receive (RX) signal propagating through the RF switch of the present disclosure.

FIG. 5B is a switch diagram illustrating an RX signal propagating through the RF switch 26. In an exemplary RX case, a magnitude of the positive offset angle $+\Theta_1$ (FIG. 4) and a magnitude of the negative offset angle $-\Theta_1$ (FIG. 4) is equal to 45°. Moreover, in the exemplary RX case, the RX signal is a sinusoidal signal in the form $B \cdot \sin(\omega_B t + \phi_B)$, where B is amplitude and, $\omega_B t$ is an angular frequency term, and $\phi_B$ is a phase angle. The RX signal propagates through the antenna 46 and into the second power splitter/combiner 42 where the RX signal is split into two equal portions that are $B/2 \cdot \sin(\omega_B t + \phi B)$. Each of the two equal portions of the RX signal propagates through a corresponding one of the null offset branch 28 and the second branch 32. Moreover, each of the two equal portions of the RX signal acquire the first inherent phase shift $\phi_1$ and the second inherent phase shift $\phi_2$ before recombining in the first power splitter/combiner 40. A recombined RX signal has the form $B \cdot \sin(\omega_B t + \phi_B + \phi_1 + \phi_2)$ that is received by a receiver (not shown) that is typically coupled to the RX/TX terminal 44. The additional phase shifts of the first inherent phase shift $\phi_1$ and the second inherent phase shift $\phi_2$ do not affect communication of the RX signal.

FIGS. 6A, 6B, and 6C are switch diagrams that illustrate the suppression of IM3 products wherein the magnitude of the positive offset angle $+\Theta_1$ (FIG. 4) and the magnitude of the negative offset angle $-\Theta_1$ (FIG. 4) is equal to 45°. In particular, FIG. 6A depicts the TX signal in the form of $A \cdot \sin(\omega_A t + \phi_A)$ propagating through the RX/TX terminal 44 and into the first power splitter/combiner 40 where the TX signal is split into two equal portions equal to $A/2 \cdot \sin(\omega_A t + \phi_A)$. Concurrently, the RX signal in the form of $B \cdot \sin(\omega_B t + \phi_B)$ is captured by the antenna 46 where it propagates into the second power splitter/combiner 42 where the RX signal is split into two equal portions equal to $B/2 \cdot \sin(\omega_B t + \phi_B)$. The TX signal portion propagating through the null offset branch 28 acquires the first inherent phase shift $\phi_1$ before propagating into the first switch segment 30. The RX signal portion propagating through the null offset branch 28 acquires the second inherent phase $\phi_2$ before propagating into the first switch segment 30. The TX signal portion propagating through the second branch 32 acquires the first inherent phase $\phi_1$ plus the positive offset angle of $+45°$ before propagating into the second switch segment 34. The RX portion propagating through the second branch 32 acquires the second inherent phase shift $\phi_2$ plus the negative offset angle of $-45°$ before propagating into the second switch segment 34.

Referring now to expression (10) in the background section above along with FIGS. 6B and 6C, the IM3 products generated in the null offset branch 28 of the RF switch 26 are $\alpha \cdot \sin([2\omega_A - \omega_B]t + 2\phi_A + 2\phi_1 - \phi_B - \phi_2)$ and $\beta \cdot \sin([2\omega_B - \omega_A]t +$ $2\phi_B+2\phi_2-\phi_A-\phi_1$), where $\alpha$ and $\beta$ are amplitudes. Coefficients of expression (10) and expression (3) of the background section include losses which may occur in the RF switch 26 along with the reduction in amplitudes due to the first power splitter/combiner 40 and the second power splitter/combiner 42.

IM3 products generated in the second switch segment 34 of the second branch 32 are $\alpha \cdot \sin([2\omega_A-\omega_B]t+2\phi_A+2\phi_1-\phi_B-\phi_2+135°)$ and $\beta \cdot \sin([2\omega_B-\omega_A]t+2\phi_B+2\phi_2-\phi_A-\phi_1-135°)$. The IM3 products generated in the first switch segment 30 and the second switch segment 34 at frequency $2\omega_A-\omega_B$ are equal and in phase. Likewise, so are the IM3 products at frequency $2\omega_B-\omega_A$.

At this point, the IM3 products generated propagate towards the antenna 46 and towards the RX/TX terminal 44, as indicated by the arrows in FIGS. 6B and 6C. While propagating towards the antenna 46, the IM3 products in the second branch 32 pass back through the first negative phase shift network 38, thereby imparting an extra phase shift of −45° to the IM3 products. No extra phase shift is imparted to the IM3 products in the null offset branch 28. As a result, the IM3 products having the frequency $2\omega_B-\omega_A$ arrive at the second power splitter/combiner 42 with a mutual phase difference of −180°. As a result, these IM3 products substantially cancel each other before reaching the antenna 46. In contrast, the IM3 products having the frequency $2\omega_A-\omega_B$ arrive at the second power splitter/combiner 42 with a mutual phase difference of 90°. Therefore, these IM3 products do not cancel. Instead, these IM3 products add constructively to become $\alpha \cdot \text{sqrt}(2) \cdot \sin([2\omega_A-\omega_B]t+\phi)$ before being transmitted from the antenna 46.

Meanwhile, the IM3 products propagating through the second branch 32 towards the RX/TX terminal 44 pass back through the first positive phase shift network 36, thereby acquiring an extra phase shift of +45°. No extra phase shift is imparted to the IM3 products propagating through the null offset branch 28. As such, the IM3 products at the frequency $2\omega_A-\omega_B$ arrive at the first power splitter/combiner 40 with a mutual +180° phase separation. Thus, these IM3 products substantially cancel before reaching the RX/TX terminal 44. In contrast, the IM3 products having the frequency $2\omega_B-\omega_A$ arrive at the first power splitter/combiner 40 with a mutual phase difference of 90°. Therefore, these IM3 products do not cancel. Instead, these IM3 products add constructively to become $\alpha \cdot \text{sqrt}(2) \cdot \sin([2\omega_A-\omega_B]t+\phi)$ before propagating through the RX/TX terminal 44.

FIG. 7A is a switch diagram illustrating a transmit (TX) signal propagating through the RF switch 26 wherein a magnitude of the positive offset angle +$\Theta_1$ (FIG. 4) and a magnitude of the negative offset angle −$\Theta_1$ (FIG. 4) is equal to 90°. Moreover, in this exemplary TX case, the TX signal is a sinusoidal signal in the form $A \cdot \sin(\omega_A t+\phi_A)$ where A is amplitude, $\omega_A t$ is an angular frequency term, and $\phi_A$ is a phase angle. The TX signal propagates through the RX/TX terminal 44 and into the first power splitter/combiner 40 where the TX signal is split into two equal portions that are $A/2 \cdot \sin(\omega_A t+\phi_A)$. Each of the two equal portions of the TX signal propagates through a corresponding one of the null offset branch 28 and the second branch 32. Moreover, each of the two equal portions of the TX signal acquire the first inherent phase shift $\phi_1$ and the second inherent phase shift $\phi_2$ before recombining in the second power splitter/combiner 42. A recombined TX signal has the form $A \cdot \sin(\omega_A t+\phi_A+\phi_1+\phi_2)$ that is transmitted from the antenna 46. The additional phase shifts of the first inherent phase shift $\phi_1$ and the second inherent phase shift $\phi_2$ do not affect communication of the TX signal.

FIG. 7B is a switch diagram illustrating an RX signal propagating through the RF switch 26. In an exemplary RX case, a magnitude of the positive offset angle +$\Theta_1$ (FIG. 4) and a magnitude of the negative offset angle −$\Theta_1$ (FIG. 4) is equal to 90°. Moreover, in the exemplary RX case, the RX signal is a sinusoidal signal in the form $B \cdot \sin(\omega_B t+\phi_B)$, where B is amplitude and, $\omega_B t$ is an angular frequency term, and $\phi_B$ is a phase angle. The RX signal propagates through the antenna 46 and into the second power splitter/combiner 42 where the RX signal is split into two equal portions that are $B/2 \cdot \sin(\omega_B t+\phi_B)$. Each of the two equal portions of the RX signal propagates through a corresponding one of the null offset branch 28 and the second branch 32. Moreover, each of the two equal portions of the TX signal acquire the first inherent phase shift $\phi_1$ and the second inherent phase shift $\phi_2$ before recombining in the first power splitter/combiner 40. A recombined RX signal has the form $B \cdot \sin(\omega_B t+\phi_B+\phi_1+\phi_2)$ that is received by a receiver (not shown) that is typically coupled to the RX/TX terminal 44. The additional phase shifts of the first inherent phase shift $\phi_1$ and the second inherent phase shift $\phi_2$ do not affect communication of the RX signal.

FIGS. 8A, 8B, and 8C are switch diagrams that illustrate the suppression of IM3 products wherein the magnitude of the positive offset angle +$\Theta_1$ (FIG. 4) and the magnitude of the negative offset angle −$\Theta_1$ (FIG. 4) is equal to 90°. In particular, FIG. 8A depicts the TX signal in the form of $A \cdot \sin(\omega_A t+\phi_A)$ propagating through the RX/TX terminal 44 and into the first power splitter/combiner 40 where the TX signal is split into two equal portions equal to $A/2 \cdot \sin(\omega_A t+\phi_A)$. Concurrently, the RX signal in the form of $B \cdot \sin(\omega_B t+\phi_B)$ is captured by the antenna 46 where it propagates into the second power splitter/combiner 42 where the RX signal is split into two equal portions equal to $B/2 \cdot \sin(\omega_B t+\phi_B)$. The TX signal portion propagating through the null offset branch 28 acquires the first inherent phase shift $\phi_1$ before propagating into the first switch segment. The RX signal portion propagating through the null offset branch 28 acquires the second inherent phase $\phi_2$ before propagating into the first switch segment 30. The TX signal portion propagating through the second branch 32 acquires the first inherent phase $\phi_1$ plus the positive offset angle of +90° before propagating into the second switch segment 34. The RX portion propagating through the second branch acquires the second inherent phase $\phi_2$ plus the negative offset angle of −90° before propagating into the second switch segment 34.

Referring now to expression (10) in the background section above along with FIGS. 8B and 8C, the IM3 products generated in the null offset branch 28 of RF switch 26 are $\alpha \cdot \sin([2\omega_A-\omega_B]t+2\phi_A+2\phi_1-\phi_B-\phi_2)$ and $\beta \cdot \sin([2\omega_B-\omega_A]t+2\phi_B+2\phi_2-\phi_A-\phi_1)$, where $\alpha$ and $\beta$ are amplitudes. Coefficients of expression (10) and expression (3) of the background section include losses which may occur in the RF switch 26 along with the reduction in amplitudes due to the first power splitter/combiner 40 and the second power splitter/combiner 42.

IM3 products generated in the second switch segment 34 of the second branch 32 are $\alpha \cdot \sin([2\omega_A-\omega_B]t+2\phi_A+2\phi_1-\phi_B-\phi_2+270°)$ and $\beta \cdot \sin([2\omega_B-\omega_A]t+2\phi_B+2\phi_2-\phi_A-\phi_1-270°)$. The IM3 products generated in first switch segment 30 and the second switch segment 34 at frequency $2\omega_A-\omega_B$ are equal and in phase. Likewise, so are the IM3 products at frequency $2\omega_B-\omega_A$.

At this point, the IM3 products generated propagate towards the antenna 46 and towards the RX/TX terminal 44 as indicated by the arrows in FIGS. 8B and 8C. While propagating towards the antenna 46, the IM3 products in the second branch 32 pass back through the first negative phase shift network 38, thereby imparting an extra phase shift of −90° to the IM3 products. No extra phase shift is imparted to the IM3 products in the null offset branch 28. As a result, the IM3 products at the frequency $2\omega_A-\omega_B$ arrive at the second power splitter/combiner 42 with a mutual phase difference of +180°. As a result, the IM3 products substantially cancel each other before reaching the antenna 46. In contrast, the IM3 products at the frequency $2\omega_B-\omega_A$ arrive at the second power splitter/combiner 42 with a mutual phase difference of −360°. As such, these IM3 products add constructively and are transmitted by the antenna 46.

Meanwhile, the IM3 products propagating through the second branch 32 towards the RX/TX terminal 44 pass back through the first positive phase shift network 36, thereby acquiring an extra phase shift of +90°. No extra phase shift is imparted to the IM3 products of propagating through the null offset branch 28. As such, the IM3 products at the frequency $2\omega_B-\omega_A$ arrive at the first power splitter/combiner 40 with a mutual −180° phase separation. Thus, these IM3 products substantially cancel before reaching the RX/TX terminal 44. In contrast, the IM3 products at the frequency $2\omega_A-\omega_B$ arrive at the second power splitter/combiner 42 with a mutual phase difference of +360°. As such, these IM3 products add constructively and propagate onward through the RX/TX terminal 44.

FIG. 9 depicts a second RF switch 48 operating in conjunction with the RF switch 26 to facilitate a simultaneous transmission of two relatively high power signals. The second RF switch 48 includes a null offset branch 50 having a first switch segment 52. Signals propagating through the RF switch 48 acquire a first inherent phase shift $\phi_1$ and a second inherent phase shift $\phi_2$ from inductive, resistive and capacitive parasitic elements associated with transmission lines (not shown) that are signal paths through the RF switch 48. A second branch 54 includes a second switch segment 56, a positive phase shift network 58 for shifting the IM3 products through the second branch 54 by a positive offset angle $+\Theta_2$ added to the first inherent phase shift $\phi_1$. The second branch 54 also includes a negative phase shift network 60 for shifting the IM3 products through the second branch 54 by a negative offset angle $-\Theta_2$ added to the second inherent phase shift $\phi_2$. The null offset branch 50, and the second branch 54 are adapted to be coupled between a first power splitter combiner 62 and a second power splitter/combiner 64. A receive/transmit (RX/TX) terminal 66 is communicatively coupled to the first power splitter/combiner 62 and an antenna 68 is coupled to the second power splitter/combiner 64.

FIG. 10 depicts a RF switch pair made up of the RF switch 26 and the RF switch 48 wherein the phase angle magnitudes of $\Theta_1$ and $\Theta_2$ both equal 45°. In this case, IM3 products that reach receivers (not shown) coupled to the RX/TX terminal 44 and the RX/TX terminal 66 are practically cancelled if $\omega_A$ is set equal to a TX frequency in universal mobile telecommunications system (UMTS) band 5 (B5), $\omega_a$ is set equal to RX frequency UMTS B5, $\omega_B$ is set equal to TX frequency UMTS B13, and $\omega_b$ is set to RX frequency UMTS B13. The reason the IM3 products are practically cancelled is due to $2\omega_A-\omega_B$ being approximately equal to $\omega_a$ and $2\omega_B-\omega_A$ being approximately equal to $\omega_b$. Moreover, remaining IM3 products within the RF switch 26 are radiated from the antenna 46 and are captured by the antenna 68 at a reduced level due to a 90° phase recombination.

FIG. 11 is a circuit diagram that depicts the RF switch pair wherein the phase angle magnitudes of $\Theta_1$ and $\Theta_2$ both equal 90°. In this case, IM3 products that reach receivers (not shown) coupled to the RX/TX terminal 44 and the RX/TX terminal 66 are not cancelled if $\omega_A$ is set equal to a TX frequency in UMTS B5, $\omega_a$ is set equal to RX frequency UMTS B5, $\omega_B$ is set equal to TX frequency UMTS B13, and $\omega_b$ is set to RX frequency UMTS B13. The reason the IM3 products are not cancelled is due to $2\omega_A-\omega_B$ being approximately equal to $\omega_a$ and $2\omega_B-\omega_A$ being approximately equal to $\omega_b$. Moreover, the IM3 products within the RF switch 26 are radiated from the antenna 46 and are captured by the antenna 68 with only a relatively small amount of attenuation. As a result, the captured IM3 products propagate through the RX/TX terminal 66 and de-sense a receiver (not shown) coupled to the RX/TX terminal 66. Similarly, the IM3 products within the RF switch 48 are radiated from the antenna 68 and are captured by the antenna 46 with only a relatively small amount of attenuation. As a result, the captured IM3 products propagate through the RX/TX terminal 44 and de-sense a receiver (not shown) coupled to the RX/TX terminal 44.

Fortunately, as shown in FIG. 12, the receiver de-sensing can be overcome by swapping a TX/RX pairing of receivers (not shown) coupled to the RX/TX terminal 44 and the RX/TX terminal 66, respectively. Not only do the IM3 products generated within the RF switch 26 and the RF switch 48 propagating through the RX/TX terminal 44 and the RX/TX terminal 66 fall outside the UMTS B5 and the UMTS B13, the IM3 products leaking through the antenna 46 and the antenna 68 also fall outside the UMTS B5 and the UMTS B13. One way to realize a swapping of TX/RX pairing of receivers is to incorporate duplexers with swapped RX and TX filters (not shown).

FIG. 13 is a spectrum diagram illustrating LTE-Advanced dual TX carriers creating IM3 products that fall within an RX duplexed channel. One application for the RF switch pair (FIG. 9) comprising the RF switch 26 and the RF switch 48 is for solving receiver de-sensing caused by an LTE-Advanced front-end that transmits two carriers having IM3 products that fall within an RX band of an RX carrier. In a case of LTE-Advanced dual TX carriers, $\omega_a$ is set equal to a TX frequency TX#1 and $\omega_b$ is set equal to a TX frequency TX#2 wherein $\omega_a$ is greater than $\omega_b$.

FIG. 14 is a circuit diagram that depicts the RF switch pair made up of the RF switch 26 and the RF switch 48 wherein the phase angle magnitude of $\Theta_1$ is 90° and the phase angle magnitude $\Theta_2$ is 45°. Referring back to FIG. 13 it can been illustrated that the RF switch pair made up of the RF switch 26 and the RF switch 48 is well suited for LTE Advanced operation because the IM3 products $2\omega_A-\omega_B$ that would ordinarily fall within the receive bands RX#1 and RX#2 are cancelled before reaching the TX/RX terminal 44 and the TX/RX terminal 66. Further still, the IM3 products $2\omega_B-\omega_A$, which are on the lower side of TX#1 cannot fall within a receive band because receive bands for LTE-Advanced are high side duplexed.

The IM3 products $2\omega_B-\omega_A$ are radiated from the antenna 46 and the antenna 68. However, the IM3 products $2\omega_B-\omega_A$ are attenuated by an amount of antenna isolation between the antenna 46 and the antenna 68. The amount of antenna isolation is typically around 10 dB. Alternately, diplexer isolation can be used to attenuate the IM3 products $2\omega_B-\omega_A$ if a single antenna is used in place of the antenna 48 and the antenna 68. Note that there is no need for extra filtering if duplexers are used in support of multiple input multiple output (MIMO) and/or antenna diversity configurations because two receiver filters will inherently be available.

In a case that utilizes a low-side duplexer wherein a used receive frequency is below a used TX frequency, $\omega_b$ is set equal to a TX frequency TX#1 and $\omega_a$ is set equal to a TX frequency TX#2 wherein $\omega_a$ is greater than $\omega_b$. Moreover, the IM3 products $2\omega_B-\omega_A$ are within receive bands that are located below TX#1. As such, the IM3 products $2\omega_B-\omega_A$ are cancelled before reaching the TX/RX terminal 44 and the TX/RX terminal 66. Further still, the IM3 products $2\omega_A-\omega_B$, which are on the higher side of TX#2 cannot fall within a receive band because receive bands in this case are low-side duplexed. Thus, allocation of TX frequency carriers are allocated to the TX/RX terminal 44 and the TX/RX terminal 66 based upon low side or high side receiver operation.

FIGS. 15A-15C are switch diagrams illustrating that radiated IM3 products are reduced in magnitude due to a power split. The term $\alpha$ for the IM3 product $\alpha \cdot \sin([2\omega_A-\omega_B]t+2\phi_A+2\phi_1-\phi_B-\phi_2)$ is proportional to $\frac{3}{2}(A/2)^2(B/2)$, where A is the amplitude of the TX signal that is $A \cdot \sin(\omega_A t + \phi_A)$ and B is the amplitude of the RX signal that is $B \cdot \sin(\omega_B t + \phi_B)$. When two of these IM3 products recombine in the second power splitter/combiner 64, the amplitude of the recombined IM3 products becomes $2 * \frac{3}{2}(A/2)^2(B/2)$, which equals $\frac{3}{2}A^2B/4$. In comparison, the amplitude of the IM3 product propagating out of the related art RF switch 10 at a frequency of $2\omega_A-\omega_B$ is proportional to $\frac{3}{2}A^2B$. As a result, the RF switch 48, when compared to the related art RF switch 10, reduces IM3 products by a ratio of 4:1, which equates to around −6 dB. An additional −3 dB reduction of the IM3 products is due to a 90° phase shift recombination of the IM3 products. Therefore, the RF switch 48 provides a total of −9 dB reduction of IM3 products in comparison to the related art RF switch 10 under ideal circumstances.

FIG. 16 depicts an alternate embodiment of FIG. 9. In this alternate embodiment, a diplexed transmit (TX) filter and RF switch 70 includes a first duplexer 72 having a TX port 74, a receive (RX) port 76, and an RX/TX port 78.

A first switch segment 80 having a first terminal 82, and a second terminal 84 is coupled via the first terminal 82 to the RX/TX port 78 of the first duplexer 72. The diplexed transmit (TX) filter and RF switch 70 further includes a second duplexer 86 having a TX port 88, an RX port 90, and an RX/TX port 92. A second switch segment 94 having a first terminal 96, and a second terminal 98 is coupled via the first terminal 96 to the RX/TX port 92 of the second duplexer 86.

A first positive phase shift network 100 having a first terminal 102 and a second terminal 104 is coupled via the second terminal 104 to the TX port 88 of the second duplexer 86. A second negative phase shift network 106 having a first terminal 108 and a second terminal 110 is coupled to the second terminal of the second switch segment 94 via the first terminal 108 of the second negative phase shift network 106. A third phase shift network 112 having a first terminal 114 and a second terminal 116 is coupled to the RX port 90 of the second duplexer 86 via the second terminal 116 of the third phase shift network 112.

The first positive phase shift network 100 provides a first positive offset angle $+\Theta_1$ and the second negative phase shift network 106 provides a first negative offset angle $-\Theta_1$. The third phase shift network 112 provides a second negative offset angle $-\Theta_2$. However, it should be noted that the first positive phase shift network 100 in other embodiments can provide the first negative offset angle $-\Theta_1$ and the second negative phase shift network 106 can provide the first positive offset angle $+\Theta_1$ while the third phase shift network 112 provides a second positive offset angle $+\Theta_2$.

The diplexed transmit (TX) filter and RF switch 70 further includes a low noise amplifier (LNA) 118 having a first input 120, a second input 122, and an output 124 wherein the first input 120 is coupled to the RX port 76 of the first duplexer 72. A receive signal RX $\omega_b$ undergoes an inherent phase shift $\phi_3$ as the receive signal RX $\omega_b$ propagates from the RX port 76 to the first input 120 of the LNA 118. The second input 122 is coupled to the first terminal 114 of the third phase shift network 112. The receive signal RX $\omega_b$ undergoes an inherent phase shift $\phi_3+\Theta_1$ as the receive signal RX $\omega_b$ propagates from the RX port 90 to the second input 122 of the LNA 118.

Due to the differential nature of the LNA 118, RX signals reaching the first input 120 and the second input 122 in phase are effectively cancelled out through common-mode rejection. The RX signals arriving 180° out of phase, on the other hand, are efficiently captured and amplified. Therefore, the third phase shift network 112 must rotate the phase of the RX signals by −90°, rather than +90°. In effect, the desired RX signal and IM3 product at frequency $2\omega_A-\omega_B$ are efficiently passed through to a receiver (not shown) and the IM3 product at $2\omega_B-\omega_A$ is rejected as long as the TX/RX pairing is swapped. As depicted in FIG. 12, TX/RX pairing is swapped in certain cases to prevent leaking IM3 products from de-sensing receivers. For example, and staying with FIG. 16, the first duplexer 72 can be adapted to filter TX signals of a first band and RX signals of a second band, while the second duplexer 86 can be adapted to filter TX signals of the second band and filter RX signals of the first band.

The diplexed TX filter and RF switch 70 also includes a first power splitter/combiner 126 having a first terminal 128, a second terminal 130, and a third terminal 132 wherein the first terminal 128 is coupled to the TX port 74 of the first duplexer 72 and the second terminal 130 is coupled to the first terminal 102 of the first positive phase shift network 100. A power amplifier (PA) 134 having a signal input terminal 136 and a signal output terminal 137 is coupled to the third terminal 132 of the first power splitter/combiner 126. Further still, the diplexed TX filter and RF switch 70 includes a second power splitter/combiner 138 having a first terminal 140, a second terminal 142, and a third terminal 144 wherein the first terminal 140 is coupled to the second terminal 84 of the first switch segment 80 and the second terminal 142 is coupled to the second terminal 110 of the second negative phase shift network 106. An antenna 146 is coupled to the third terminal 144. For a purpose of reference for upcoming FIGS. 17A and 17B, the first duplexer 72 and the first switch segment 80 comprise a null offset branch 148, while the second duplexer 86 and the second switch segment 94 comprise a second branch 150.

FIGS. 17A and 17B are Smith Charts that depict an example of duplexer input impedance plotted over a interferer signal band as seen by a power splitter/combiner looking into a null offset branch and a second branch. In particular, the FIG. 17A depicts a plot of an impedance for the null offset branch 148 (FIG. 16) and the second branch 150 (FIG. 16) without extra phase rotation, whereas the FIG. 17B depicts a plot of the impedance for the null offset branch 148 and the second branch 150 with extra phase rotation.

The embodiments discussed above include ideal phase shift networks and ideal power splitters/combiners. Realizable phase shift networks include, but are not limited to, transmission lines, inductor-capacitor (LC) pi networks, and LC tee networks. Realizable power splitters/combiners include, but are not limited to, surface mount device (SMD) transformers, solid-state transformers, and substrate based transformers. Alternately, a power splitter/combiner can be realized by coupling the null offset branch 148 to the second branch 150 via an electrical tee.

An ideal power splitter divides a signal power equally between branches regardless of any imbalance in load impedance between the branches. A realizable transformer or electrical tee based power splitter/combiner does not equally split power between branches. Instead, power is divided in the branches in inverse proportion to a real part of a load through each branch as seen from a reference frame of the power splitter/combiner. If duplexers are included in the branches as with the present disclosure, an out-of-band impedance of the duplexers is significantly different than an impedance seen from the reference frame of either of the power splitter/combiners. Therefore, the extra phase shift offset of the first positive offset angle $+\Theta_1$ and the first negative offset angle $-\Theta_1$ in the second branch 150 behave like transformers with respect to the impedance seen from the reference frame of either of the first power splitter/combiner 126 and the second power splitter/combiner 138. As shown in FIG. 17A, the null offset branch 148 (FIG. 16) and the second branch 150 (FIG. 16) can have significantly different impedances in the null offset branch 148 and the second branch 150 as seen from the reference frame of either of the first power splitter/combiner 126 and the second power splitter/combiner 138. As a result, signal power is delivered disproportionately to the null offset branch 148 versus the second branch 150. Consequently, the IM3 products generated in the null offset branch 148 and the second branch 150 are incompletely cancelled.

Cancellation of the IM3 products can be significantly improved by adjusting the extra phase shift of the second negative offset angle $-\Theta_1$ (FIG. 16). FIG. 17B shows that an input port voltage reflection coefficient known as input scattering parameter $S_{11}$ measured for the null offset branch 148 and the second branch 150 can be altered to provide the extra phase shift of the second negative offset angle $-\Theta_1$. In the following example, the magnitude of the first offset angle $\Theta_1$ and the negative offset angle $-\Theta_1$ is 90°. An RX signal traverses the first positive phase shift network 100, the first duplexer 72, and the second negative phase shift network 106 twice during a round trip from the first power splitter/combiner 126 and the second power splitter/combiner 138. Due to a net 90° phase difference between the null offset branch 148 and the second branch 150, two voltage reflections of the input scattering parameter $S_{11}$ become out of phase with each other by 180°. Thus, the two voltage reflections appear on opposite sides of the Smith Charts of FIGS. 17A and 17B. By ensuring that a voltage refection of the null offset branch 148 falls on an imaginary axis on the Smith Chart of FIG. 17B, a voltage reflection of the second branch 150 will also fall on the imaginary axis of the Smith Chart of FIG. 17B. Thus, a criterion is met that both the null offset branch 148 and the second branch 150 exhibit equal real parts of their impedance as seen from the reference frames of the first power splitter/combiner 126 and the second power splitter/combiner 138.

Another extra phase shift can be provided with regard to optimal power balance and a cancellation of IM3 products generated by the TX signal propagating through the TX port 74 of the first duplexer 72 and the TX port 88 of the second duplexer 86. However, the optimization and cancellation is relatively insignificant because the signals arriving from a transmitter are in-band for the TX port 74 of the first duplexer 72 and the TX port 88 of the second duplexer 86. As such, the input scattering parameter $S_{11}$ for either TX port 74 or TX port 88 is relatively small. Thus, a relatively high amount of signal power balance is inherent regardless of any extra phase rotation. Nevertheless, the first positive offset angle $+\Theta_1$ and the first negative offset angle $-\Theta_1$ can be adjusted to optimize IM3 cancellation.

Another consideration for embodiments of the present disclosure is an undesirable behavior as the antenna 146 (FIG. 16) deviates from an intended impedance. Antenna impedance fluctuations are common for mobile terminals such as cellular handsets due to changes in a near field environment surrounding the antenna 146. For example, antenna impedance as seen by circuitry with a hand set can vary significantly as the handset is held in mid-air versus being held close to a user's ear, versus being laid upon a metal table, versus being placed in a purse, etc. A VSWR increases as antenna impedance deviates from an ideal value. A higher VSWR value indicates that more energy is being reflected instead being transmitted efficiently, which results in degraded or dropped calls, reduced data rates, and decreased battery efficiency. However, in the context of IM3 cancellation, higher VSWR values leads to additional IM3 generation as a portion of a TX signal reflects from the antenna 146 and propagates back into the null offset branch 148 and the second branch 150. However, even at a VSWR value of 3:1, embodiments of the present disclosure provides more than 13 dB of IM3 suppression over the related art RF switch 10 (FIG. 2), which means that more than 95% of the power of the IM3 products are eliminated by embodiments of the present disclosure.

Figure 1:
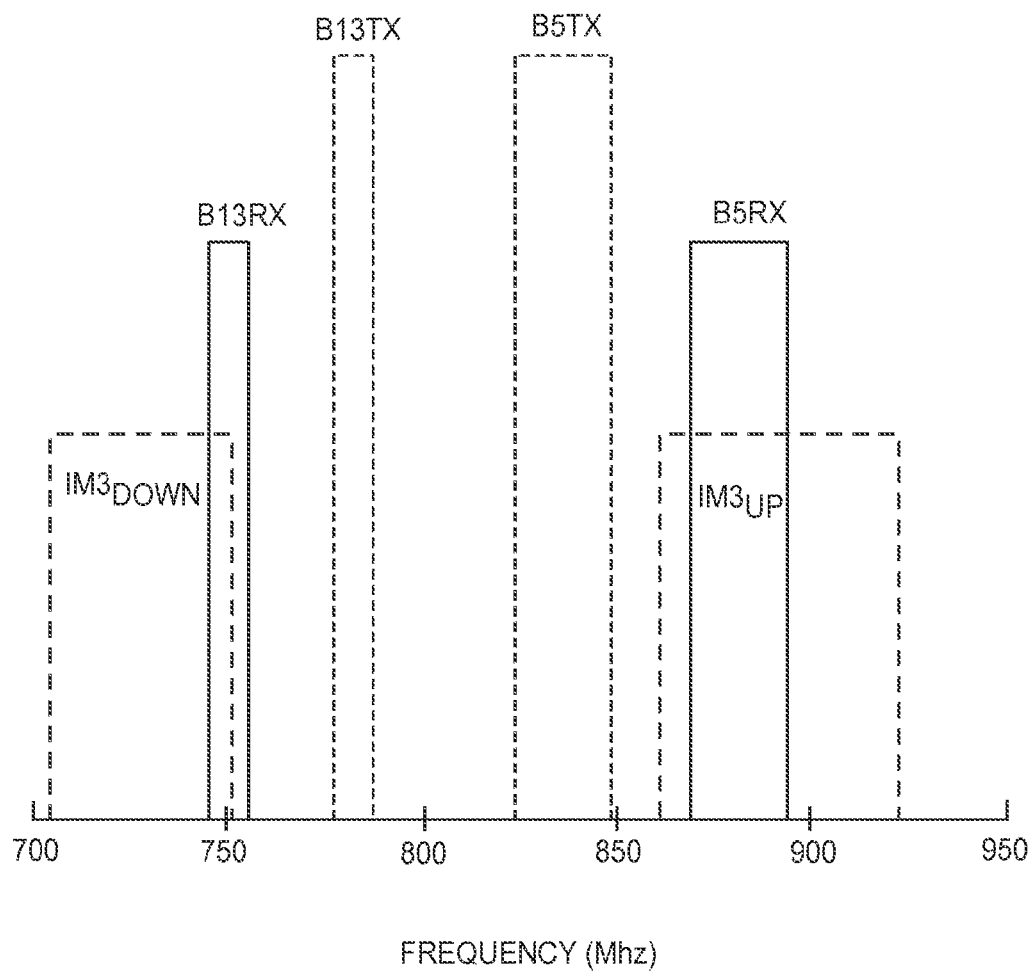
FIG. 1 is a frequency spectrum diagram for universal mobile telecommunications system (UMTS) band 5 and evolved UMTS terrestrial radio access (E-UTRA) Band 13 that illustrates the impact of undesirable third order intermodulation (IM3) products on receive (RX) bands.
Figure 2:
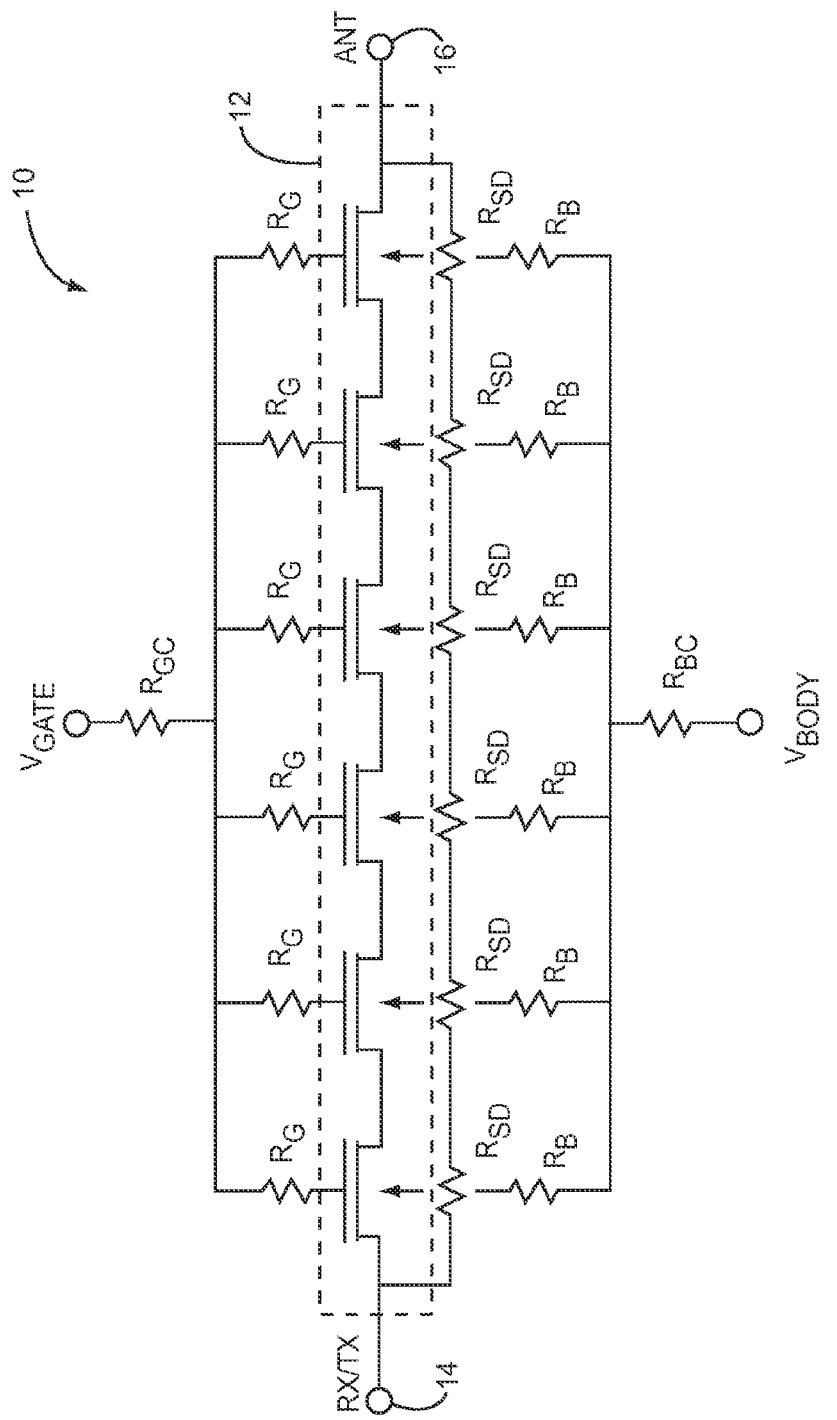
FIG. 2 is a circuit diagram for a related art RF switch having six stacked field effect transistors (FETs) for enhanced voltage handling capability.
Figure 3:
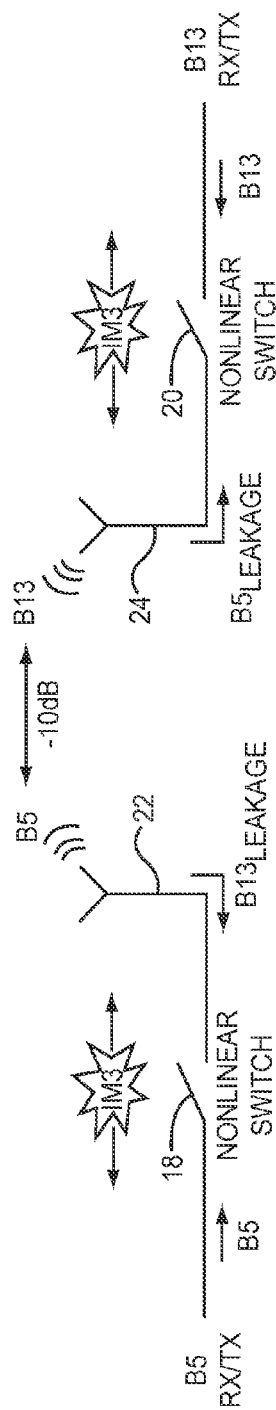
FIG. 3 is a diagram illustrating a related art attempt at relaxing RF switch linearity requirements by utilizing separate antennas transmit and receive paths for the Band 5 (B5) and Band 13 (B13).

FIG. 18A is a schematic diagram for a simulator configuration 152 that is usable to simulate the related art RF switch 10 depicted in FIG. 2. The simulation begins with a TX signal generator 154 that generates a TX signal having a frequency of 786 MHz and a power 0 dBm. The TX signal propagates through a duplexer such as the first duplexer 72 (FIG. 16) and the related art RF switch 10 (FIG. 2), which is modeled by a linear model of Silicon-on-insulator (SOI) switch 156 and a shunt third-order nonlinear element 158. The shunt third-order nonlinear element 158 generates simulated IM3 products in order to represent nonlinear behavior of the related art RF switch 10. The simulator configuration 152 also includes an antenna VSWR tuning block 160 having a VSWR phase shift function 162 and a first ideal transformer 164. The antenna VSWR tuning block 160 is coupled between the related art RF switch 10 and a second ideal transformer 166 that in turn is coupled through a current probe 168 to a first resistor 170 that simulates an antenna such as antenna 146 (FIG. 16). An interferer signal generator 172 is communicatively coupled through a second resistor 174 to a tap 176 between the current probe 168 and the second ideal transformer 166. The interferer signal generator 172 generates an interferer signal at 836 MHz with a relatively high-power of about 0 dBm at the tap 176. The antenna VSWR tuning block 160 with the VSWR phase shift function combined with the first ideal transformer 164 and the second ideal transformer 166 provide a user-selectable non-ideal antenna VSWR.

The diplexed TX filter and RF switch 70 of the present disclosure is simulated using a simulator configuration 178 depicted in a schematic diagram of FIG. 18B. The simulator configuration 178 is a modified embodiment of the simulator configuration 152 (FIG. 18A). The simulator configuration 178 replaces the related art RF switch 10 (FIG. 2) with the first switch segment 80 (FIG. 16) and the second switch segment 94 (FIG. 16), which are each modeled by a linear model of Silicon-on-insulator (SOI) switch segment 180 and the shunt third-order nonlinear element 158 (FIG. 18A). The first positive phase shift network 100 (FIG. 16) and the second negative phase shift network 106 (FIG. 16) are inductor-capacitor (LC) tee networks that each comprise series inductors L1 and L2 and a shunt capacitor C1. The third phase shift network 112 (FIG. 16) comprise series capacitors C2 and C3 and a shunt inductor L3. A power division of the TX signal is achieved using a pair of transformers 182 having primary coils in series and secondary coils in parallel. The pair of transformers 182 models a single 4-port transformer (not shown) with one primary coil and two secondary coils. A third ideal transformer 184 couples the switch segment 180 to the antenna VSWR tuning block 160.

During a simulation, divided portions of the TX signal propagate through the null offset branch 28 (FIG. 4), and the second branch 32 (FIG. 4). The null offset branch 28 does not add a phase shift. However, the first positive phase shift network 36 adds a positive offset of +90° to the TX signal portion propagating through the second branch 32 before the TX signal portion arrives at the second switch segment 34. After propagating through the second switch segment 34 the second branch TX signal portion is phase shifted −90° by the first negative phase shift network 38. The TX signal portion propagating through the null offset branch 28 continues through the first switch segment 30 and into the third ideal transformer 184, where the null offset TX portion is recombined with the second and third branch TX signal portions.

For purposes of this simulation, the pair of transformers 182 have turns ratios of 1:$\sqrt{2}$. These particular turns ratios were used so that an existing 50Ω RF switch design (not shown) could be used for the simulation. These turns ratios effectively doubles a 50Ω impedance of each of the null offset branch 148 and the second branch 150 to 100Ω. In this way, a parallel impedance of a parallel combination of the null offset branch 148, and the second branch 150 reduces to a required 50Ω. The third ideal transformer 184 has a turns ratio of 1:$\sqrt{2}$. In a real-world implementation of the RF switch 70, the null offset branch 148 and the second branch 150 can be designed to provide 100Ω impedances inherently. In such a case, impedance transformations would be unnecessary and the pair of transformers 182 would have 1:1 turns ratios and the third ideal transformer 184 would be eliminated.

The simulation results are shown in FIGS. 19A through 19D. These spectral plots clearly show the input TX signal at 786 MHz and the interferer signal at 836 MHz, both at around 0 dBm, as well as the resultant $IM3_{down}$ and $IM3_{up}$ products at 736 MHz and 886 MHz respectively. In the first two plots shown in FIG. 19A and FIG. 19B, the results are shown for the related art RF switch 10 (FIGS. 2 and 16A) with an ideal 1:1 antenna VSWR and a worst-case 3:1 VSWR, respectively. The worst-case 3:1 VSWR is determined by first mismatching the antenna impedance by a 3:1 ratio, then varying the VSWR phase through a full 360° via the antenna VSWR tuning block 160 (FIG. 16A) until a worst-case is found. The simulation shows that the related art RF switch 10 results in $IM3_{down}$ and $IM3_{up}$ generation at levels of −45.5 dBm each with an ideal antenna. With a 3:1 mismatch the $IM3_{down}$ level increases to −26.8 dBm. The reason for the asymmetric impact is that the interferer signal is partially blocked from reaching the nonlinear switches by the VSWR mismatch, while the desired signal is still delivered as before. This can be compared to FIGS. 19C and 19D which show the same results for the newly invented circuit. By employing the RF switch 70 (FIG. 16), the $IM3_{down}$ power is reduced to −64.4 dBm under ideal conditions and −40.4 dBm when mismatched. Thus, the RF switch 26 improves $IM3_{down}$ suppression by approximately 18.9 dB under matched conditions and 13.6 dB under mismatched conditions. This improvement in IM3 reduction is sufficient to allow realization of SV-LTE using existing switch and duplexer technology. It should also be noted that while the may use up to twice the number of non-linear components, such as switch segments and duplexers, each of the non-linear components operates at half the power and twice the impedance of a related art switch such as related art RF switch 10 (FIG. 2). As a result, the RF switch 26 of the present disclosure is neither significantly larger nor significantly more expensive than the related art RF switch 10.

Turning now to FIG. 20, the diplexed TX filter and RF switch 70 is incorporated in a mobile terminal 186, such as a cellular handset, a personal digital assistant (PDA), or the like. The basic architecture of the mobile terminal 186 may include a receiver front end 188, an RF transmitter section 190, an antenna 192, a baseband processor 194, a control system 196, a frequency synthesizer 198, and an interface 200. The receiver front end 188 receives information bearing RF signals from one or more remote transmitters provided by a base station. A low noise amplifier (LNA) 202 amplifies the signal. A filter circuit 204 minimizes broadband interference in the received signal, while downconversion and digitization circuitry 206 downconverts the filtered, received signal to an intermediate or baseband frequency signal, which is then digitized into one or more digital streams. The receiver front end 188 typically uses one or more mixing frequencies generated by the frequency synthesizer 198.

The baseband processor 194 processes the digitized received signal to extract the information or data bits conveyed in the received signal. This processing typically comprises demodulation, decoding, and error correction operations. As such, the baseband processor 194 is generally implemented in one or more digital signal processors (DSPs).

On the transmit side, the baseband processor 194 receives digitized data, which may represent voice, data, or control information from the control system 196 which it encodes for transmission. The encoded data is output to the RF transmitter section 190, where it is used by a modulator 208 to modulate a carrier signal that is at a desired transmit frequency. Power amplifier (PA) circuitry 210 amplifies the modulated carrier signal to a level appropriate for transmission from the antenna 192. The control system 196 generates an RF SWITCH CONTROL signal that is usable to turn the diplexed TX filter and RF switch 70 on and off.

A user may interact with the mobile terminal 186 via the interface 200 which may include interface circuitry 212 associated with a microphone 214, a speaker 216, a keypad 218, and a display 220. The interface circuitry 212 typically includes analog-to-digital converters, digital-to-analog converters, amplifiers, and the like. Additionally, it may include a voice encoder/decoder, in which case it may communicate directly with the baseband processor 194.

The microphone 214 will typically convert audio input, such as the user's voice, into an electrical signal which is then digitized and passed directly or indirectly to the baseband processor 194. Audio information encoded in the received signal is recovered by the baseband processor 194 and converted into an analog signal suitable for driving the speaker 216 by the interface circuitry 212. The keypad 218 and the display 220 enable the user to interact with the mobile terminal 186 by inputting numbers to be dialed, address book information, or the like, as well as monitoring call progress information.

Those skilled in the art will recognize improvements and modifications to the preferred embodiments of the present disclosure. All such improvements and modifications are considered within the scope of the concepts disclosed herein and the claims that follow.

What is claimed is:

1. A diplexed transmit (TX) filter and RF switch comprising:
   a first duplexer having a TX port, an RX port, and an RX/TX port;
   a first switch segment having a first terminal and a second terminal wherein the first terminal is coupled to the RX/TX port of the first duplexer;
   a first phase shift network having a first terminal and a second terminal wherein the second terminal is coupled to the TX port of the first duplexer;
   a second phase shift network having a first terminal and a second terminal wherein the first terminal of the second phase shift network is coupled to the second terminal of the first switch segment; and a third phase shift network having a first terminal and a second terminal wherein the second terminal of the third phase shift network is coupled to the RX port of the first duplexer.

2. The diplexed transmit (TX) filter and RF switch of claim 1 further including a low noise amplifier (LNA) having a first input, a second input and an output wherein the second input is coupled to the first terminal of the third phase shift network.

3. The diplexed TX filter and RF switch of claim 1 further including a first power splitter/combiner having a first terminal, a second terminal and a third terminal wherein the second terminal is coupled to the first terminal of the first phase shift network.

4. The diplexed TX filter and RF switch of claim 3 further including a power amplifier having an input terminal and an output terminal wherein the output terminal is coupled to the third terminal of the first power splitter/combiner.

5. The diplexed TX filter and RF switch of claim 3 further including a second power splitter/combiner having a first terminal, a second terminal and a third terminal wherein the second terminal is coupled to the second terminal of the second phase shift network.

6. The diplexed TX filter and RF switch of claim 5 further including an antenna coupled to the third terminal of the second power splitter/combiner.

7. The diplexed TX filter and RF switch of claim 5 further comprising:
a second duplexer having a TX port, an RX port, and an RX/TX port, wherein the TX port is coupled to the first terminal of the first power splitter/combiner and the RX port is coupled to the second terminal of the third phase shift network; and
a second switch segment having a first terminal coupled to the RX/TX port of the first second duplexer and a second terminal coupled to the first terminal of the second power splitter/combiner.

8. The diplexed TX filter and RF switch of claim 7 wherein the first duplexer is adapted to filter TX signals of a first band and RX signals of a second band, and wherein the second duplexer is adapted to filter TX signals of the second band and filter RX signals of the first band.

9. The diplexed TX filter and RF switch of claim 7 wherein the first switch segment and the second switch segment each comprise series stacked field effect transistors (FETs).

10. The diplexed TX filter and RF switch of claim 5 wherein the first phase shift network, the second phase shift network, and the third phase shift network each comprise an inductor-capacitor (LC) tee network.

11. The diplexed TX filter and RF switch of claim 10 wherein the LC tee network is tuned such that an input port voltage reflection coefficient for the TX port and the RX port of the second duplexer lies on a Smith Chart such that an impedance as seen from a reference frame of the first power splitter/combiner and an impedance as seen from a reference frame of the second power splitter/combiner have real parts that are substantially equal.

12. A mobile terminal comprising:
an antenna;
a receiver front end;
a diplexed TX filter and RF switch coupled between the antenna and the receiver front end, the diplexed TX filter and RF switch comprising:
a first duplexer having a TX port, an RX port, and an RX/TX port;
a first switch segment having a first terminal and a second terminal wherein the first terminal is coupled to the RX/TX port of the first duplexer;
a first phase shift network having a first terminal and a second terminal wherein the second terminal is coupled to the TX port of the first duplexer;
a second phase shift network having a first terminal and a second terminal wherein the first terminal of the second phase shift network is coupled to the second terminal of the first switch segment;
a third phase shift network having a first terminal and a second terminal wherein the second terminal of the third phase shift network is coupled to the RX port of the first duplexer; and
a control system having an RF switch control signal for turning the first switch segment on and off.

13. The mobile terminal of claim 12 further including a low noise amplifier (LNA) having a first input, a second input, and an output wherein the second input is coupled to the first terminal of the third phase shift network.

14. The mobile terminal of claim 12 further including a first power splitter/combiner having a first terminal, a second terminal, and a third terminal wherein the second terminal is coupled to the first terminal of the first phase shift network.

15. The mobile terminal of claim 14 further including a power amplifier having an input terminal and an output terminal wherein the output terminal is coupled to the third terminal of the first power splitter/combiner.

16. The mobile terminal of claim 14 further including a second power splitter/combiner having a first terminal, a second terminal, and a third terminal wherein the second terminal is coupled to the second terminal of the second phase shift network.

17. The mobile terminal of claim 16 further including an antenna coupled to the third terminal of the second power splitter/combiner.

18. The mobile terminal of claim 16 further comprising:
a second duplexer having a TX port, an RX port, and an RX/TX port, wherein the TX port is coupled to the first terminal of the first power splitter/combiner and the RX port is coupled to the second terminal of the third phase shift network; and
a second switch segment having a first terminal coupled to the RX/TX port of the first second duplexer and a second terminal coupled to the first terminal of the second power splitter/combiner.

19. The diplexed TX filter and RF switch of claim 18 wherein the first duplexer is adapted to filter TX signals of a first band and RX signals of a second band, and wherein the second duplexer is adapted to filter TX signals of the second band and filter RX signals of the first band.

20. The mobile terminal of claim 18 wherein the first switch segment and the second switch segment each comprise series stacked field effect transistors (FETs).

21. The mobile terminal of claim 16 wherein the first phase shift network, the second phase shift network, and the third phase shift network each comprise an inductor-capacitor (LC) tee network.

22. The mobile terminal of claim 21 wherein the LC tee network is tuned such that an input port voltage reflection coefficient for the second duplexer lies on a Smith Chart such that an impedance as seen from a reference frame of the first power splitter/combiner and an impedance as seen from a reference frame of the second power splitter/combiner have real parts that are substantially equal.

* * * * *